(12) United States Patent
Liu et al.

(10) Patent No.: US 12,659,063 B2
(45) Date of Patent: Jun. 16, 2026

(54) CLOCK SYNCHRONIZATION METHOD, AND RELATED APPARATUS AND DEVICE

(71) Applicant: HUAWEI TECHNOLOGIES CO., LTD., Shenzhen (CN)

(72) Inventors: Guoen Liu, Beijing (CN); Kexiong Yu, Shenzhen (CN); Li'an Wang, Shenzhen (CN); Guijie Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 262 days.

(21) Appl. No.: 18/482,123

(22) Filed: Oct. 6, 2023

(65) Prior Publication Data

US 2024/0031049 A1 Jan. 25, 2024

Related U.S. Application Data

(63) Continuation of application No. PCT/CN2021/085937, filed on Apr. 8, 2021.

(51) Int. Cl.
*H04J 3/06* (2006.01)
*H04W 56/00* (2009.01)

(52) U.S. Cl.
CPC .......... *H04J 3/0638* (2013.01); *H04J 3/0667* (2013.01); *H04W 56/0015* (2013.01)

(58) Field of Classification Search
CPC ...... H04J 3/0658; H04J 3/0661; H04J 3/0667; H04J 3/0682; H04J 3/0638; H04W 84/18; H04W 56/0015
See application file for complete search history.

(56) References Cited

U.S. PATENT DOCUMENTS

| | | | |
|---|---|---|---|
| 7,916,758 B2 | 3/2011 | Sun et al. | |
| 9,007,989 B2 * | 4/2015 | Xu .................... | H04L 27/2691 |
| | | | 370/324 |

FOREIGN PATENT DOCUMENTS

| | | |
|---|---|---|
| CN | 102111380 A | 6/2011 |
| CN | 103684728 A | 3/2014 |
| CN | 106992831 B | 8/2018 |
| CN | 109392074 A | 2/2019 |

OTHER PUBLICATIONS

International Search Report and Written Opinion issued in PCT/CN2021/085937, dated Jan. 6, 2022, 10 pages.
Extended European Search Report issued in EP21935549.2, dated Apr. 22, 2024, 9 pages.

* cited by examiner

*Primary Examiner* — Peter Chen

(57) ABSTRACT

A clock synchronization method is disclosed. The method includes: obtaining, by a slave clock apparatus, a first time point at which a master clock apparatus sends first information, a second time point at which the slave clock apparatus receives the first information from the master clock apparatus, a third time point at which the slave clock apparatus sends first feedback information, and a fourth time point at which the master clock apparatus receives the first feedback information from the slave clock apparatus; then obtaining a first clock count offset based on the first time point, the second time point, the third time point, and the fourth time point; then obtaining a first clock frequency offset based on the first clock count offset; and finally adjusting a clock count step of the slave clock apparatus based on the first clock frequency offset.

18 Claims, 20 Drawing Sheets

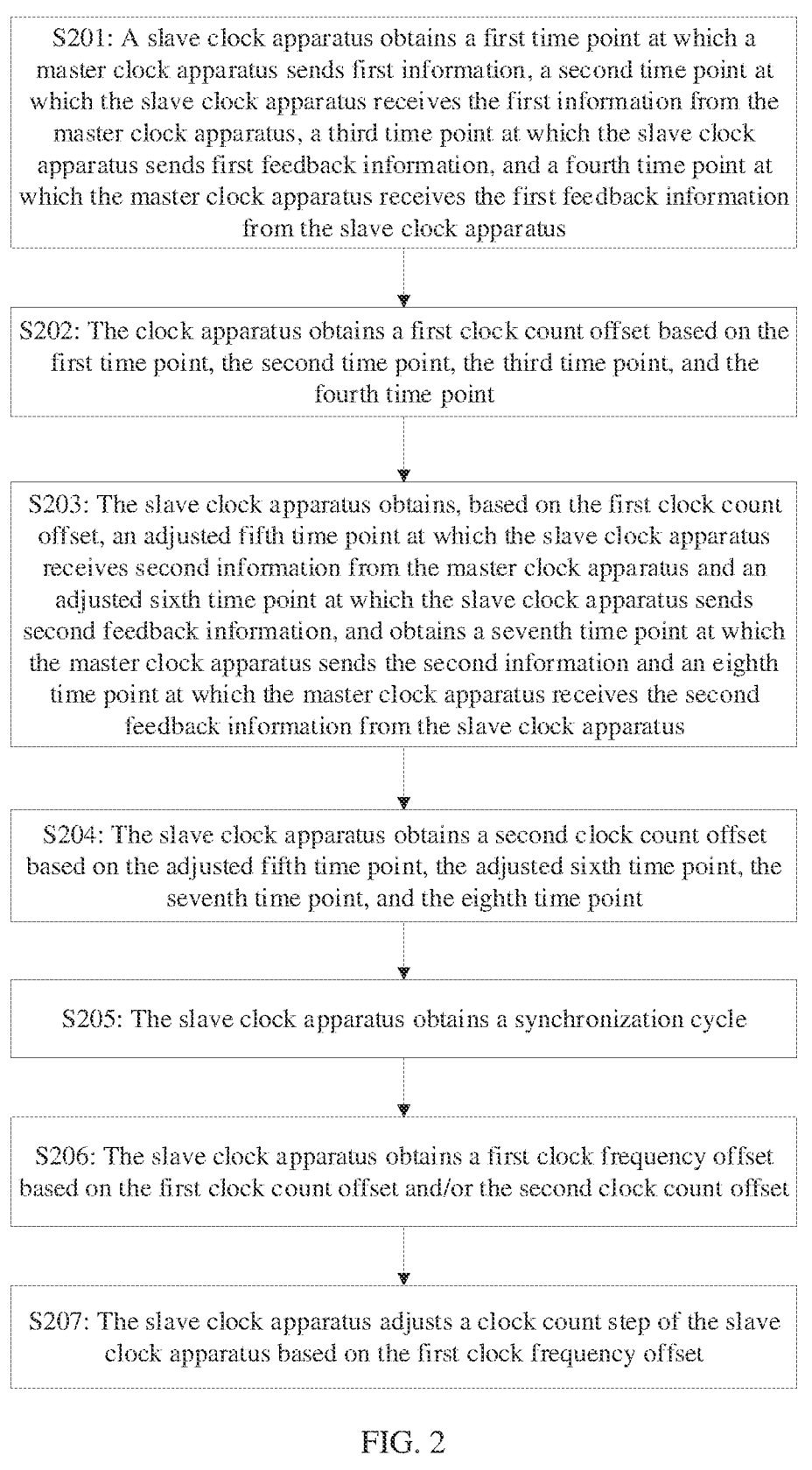

S201: A slave clock apparatus obtains a first time point at which a master clock apparatus sends first information, a second time point at which the slave clock apparatus receives the first information from the master clock apparatus, a third time point at which the slave clock apparatus sends first feedback information, and a fourth time point at which the master clock apparatus receives the first feedback information from the slave clock apparatus S202: The clock apparatus obtains a first clock count offset based on the first time point, the second time point, the third time point, and the fourth time point S203: The slave clock apparatus obtains, based on the first clock count offset, an adjusted fifth time point at which the slave clock apparatus receives second information from the master clock apparatus and an adjusted sixth time point at which the slave clock apparatus sends second feedback information, and obtains a seventh time point at which the master clock apparatus sends the second information and an eighth time point at which the master clock apparatus receives the second feedback information from the slave clock apparatus S204: The slave clock apparatus obtains a second clock count offset based on the adjusted fifth time point, the adjusted sixth time point, the seventh time point, and the eighth time point S205: The slave clock apparatus obtains a synchronization cycle S206: The slave clock apparatus obtains a first clock frequency offset based on the first clock count offset and/or the second clock count offset S207: The slave clock apparatus adjusts a clock count step of the slave clock apparatus based on the first clock frequency offset

FIG. 2

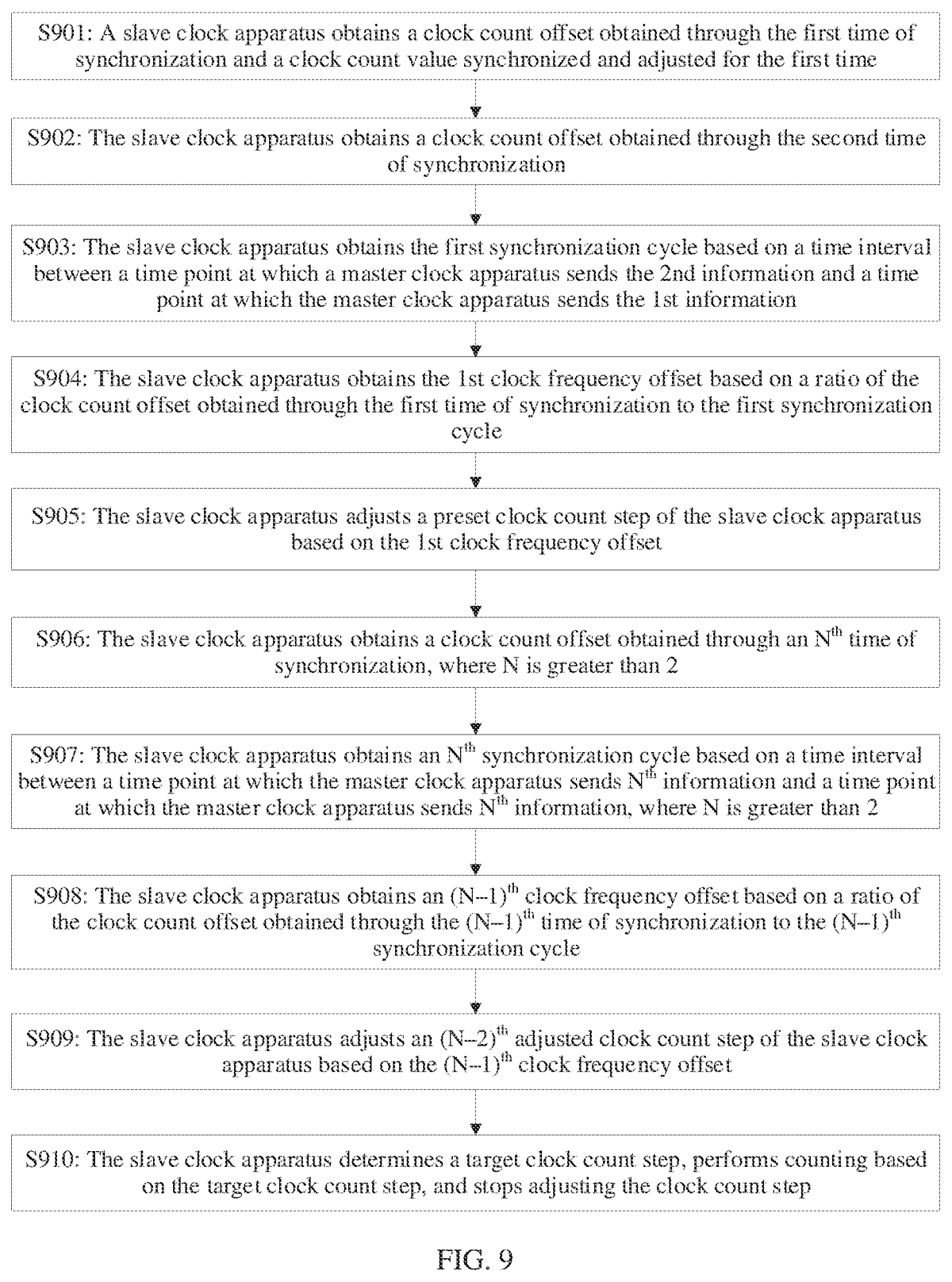

S901: A slave clock apparatus obtains a clock count offset obtained through the first time of synchronization and a clock count value synchronized and adjusted for the first time

↓

S902: The slave clock apparatus obtains a clock count offset obtained through the second time of synchronization

↓

S903: The slave clock apparatus obtains the first synchronization cycle based on a time interval between a time point at which a master clock apparatus sends the 2nd information and a time point at which the master clock apparatus sends the 1st information

↓

S904: The slave clock apparatus obtains the 1st clock frequency offset based on a ratio of the clock count offset obtained through the first time of synchronization to the first synchronization cycle

↓

S905: The slave clock apparatus adjusts a preset clock count step of the slave clock apparatus based on the 1st clock frequency offset

↓

S906: The slave clock apparatus obtains a clock count offset obtained through an $N^{th}$ time of synchronization, where N is greater than 2

↓

S907: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2

↓

S908: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle

↓

S909: The slave clock apparatus adjusts an $(N-2)^{th}$ adjusted clock count step of the slave clock apparatus based on the $(N-1)^{th}$ clock frequency offset

↓

S910: The slave clock apparatus determines a target clock count step, performs counting based on the target clock count step, and stops adjusting the clock count step

FIG. 9

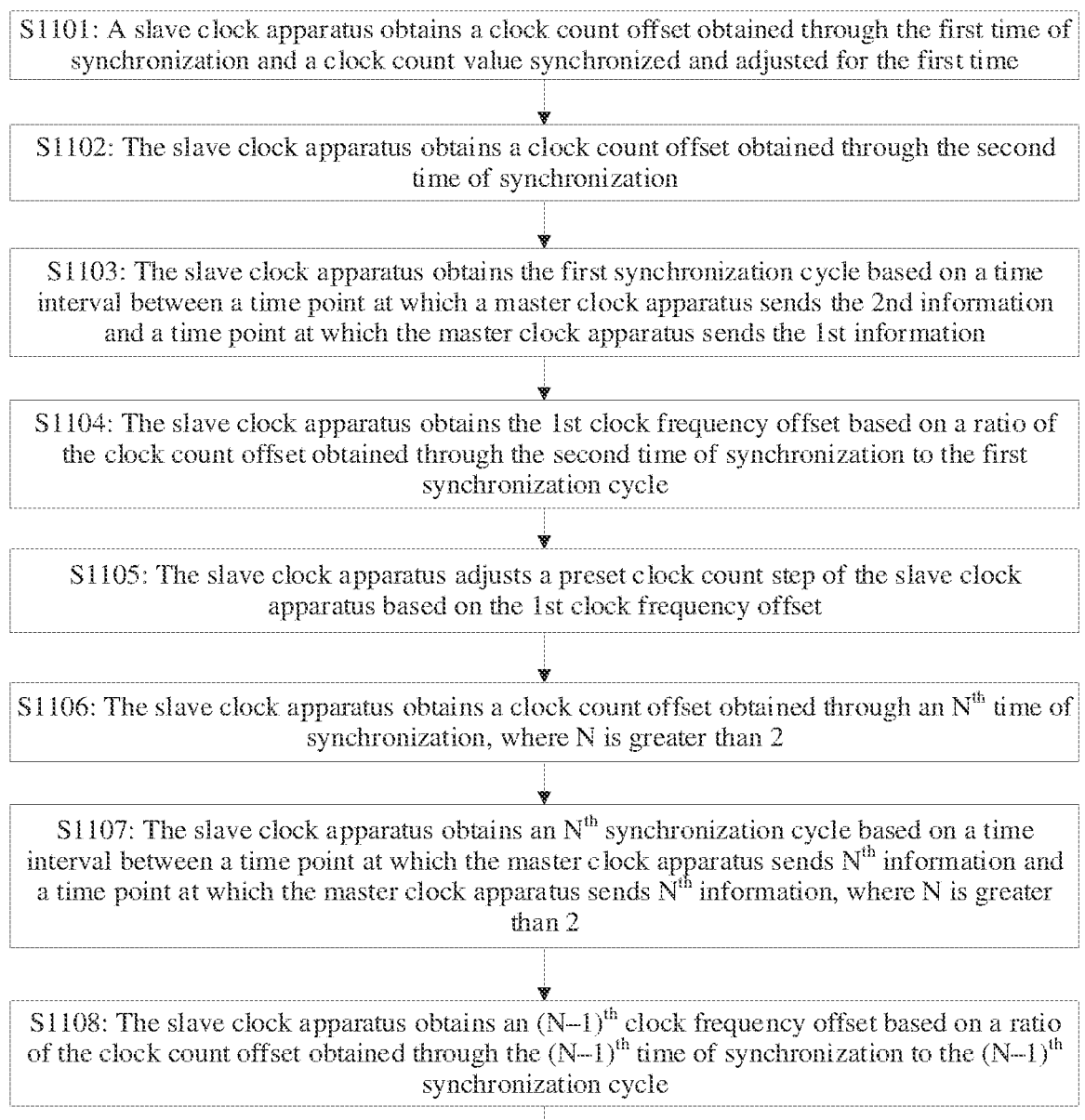

S1101: A slave clock apparatus obtains a clock count offset obtained through the first time of synchronization and a clock count value synchronized and adjusted for the first time S1102: The slave clock apparatus obtains a clock count offset obtained through the second time of synchronization S1103: The slave clock apparatus obtains the first synchronization cycle based on a time interval between a time point at which a master clock apparatus sends the 2nd information and a time point at which the master clock apparatus sends the 1st information S1104: The slave clock apparatus obtains the 1st clock frequency offset based on a ratio of the clock count offset obtained through the second time of synchronization to the first synchronization cycle S1105: The slave clock apparatus adjusts a preset clock count step of the slave clock apparatus based on the 1st clock frequency offset S1106: The slave clock apparatus obtains a clock count offset obtained through an $N^{th}$ time of synchronization, where N is greater than 2

S1107: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2

S1108: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle S1109: The slave clock apparatus adjusts an $(N-2)^{th}$ adjusted clock count step of the slave clock apparatus based on the $(N-1)^{th}$ clock frequency offset S1110: The slave clock apparatus determines a target clock count step, performs counting based on the target clock count step, and stops adjusting the clock count step

FIG. 11

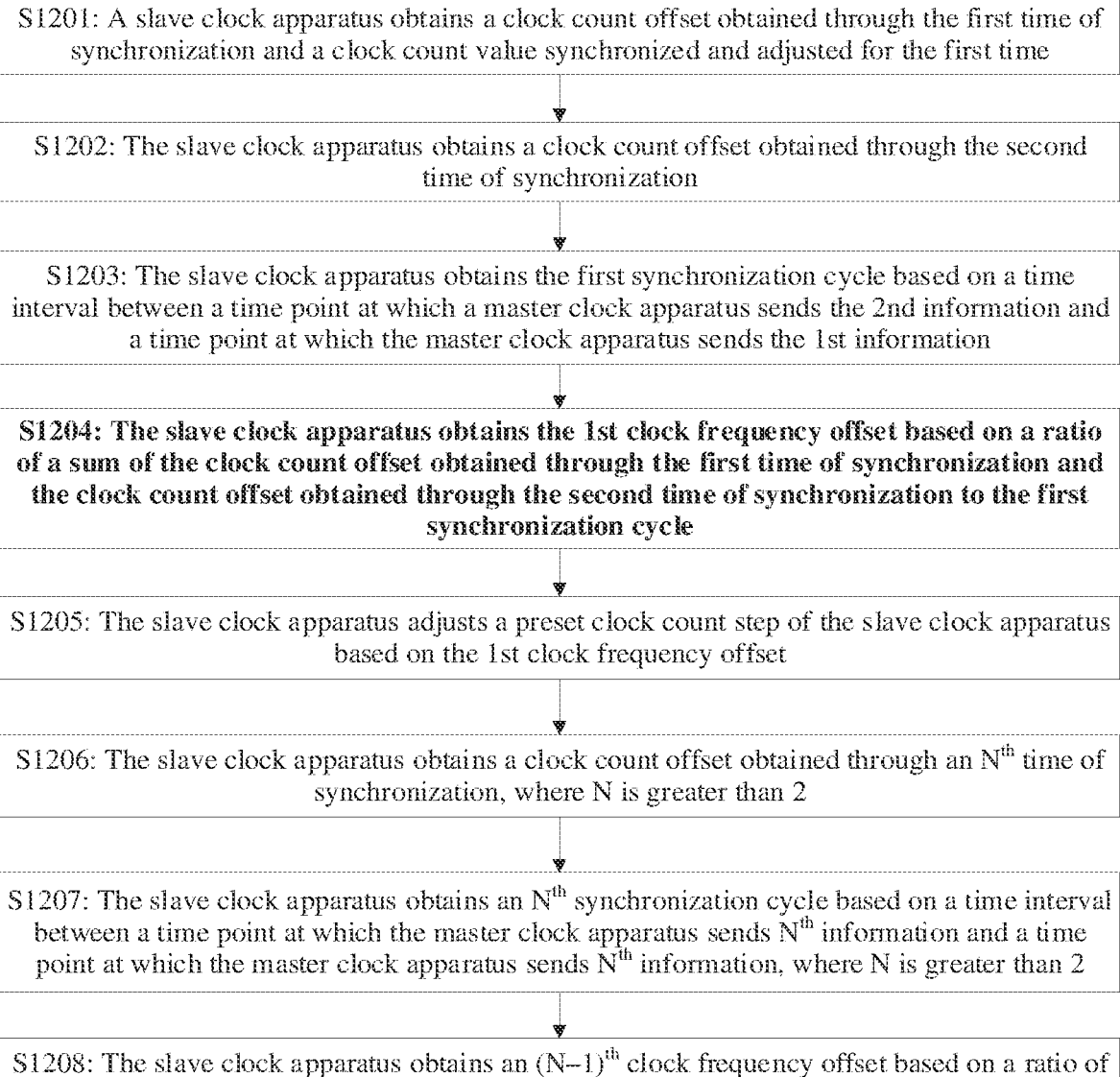

S1201: A slave clock apparatus obtains a clock count offset obtained through the first time of synchronization and a clock count value synchronized and adjusted for the first time S1202: The slave clock apparatus obtains a clock count offset obtained through the second time of synchronization S1203: The slave clock apparatus obtains the first synchronization cycle based on a time interval between a time point at which a master clock apparatus sends the 2nd information and a time point at which the master clock apparatus sends the 1st information

S1204: The slave clock apparatus obtains the 1st clock frequency offset based on a ratio of a sum of the clock count offset obtained through the first time of synchronization and the clock count offset obtained through the second time of synchronization to the first synchronization cycle

S1205: The slave clock apparatus adjusts a preset clock count step of the slave clock apparatus based on the 1st clock frequency offset S1206: The slave clock apparatus obtains a clock count offset obtained through an $N^{th}$ time of synchronization, where N is greater than 2

S1207: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2

S1208: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle S1209: The slave clock apparatus adjusts an $(N-2)^{th}$ adjusted clock count step of the slave clock apparatus based on the $(N-1)^{th}$ clock frequency offset S1210: The slave clock apparatus determines a target clock count step, performs counting based on the target clock count step, and stops adjusting the clock count step

FIG. 12

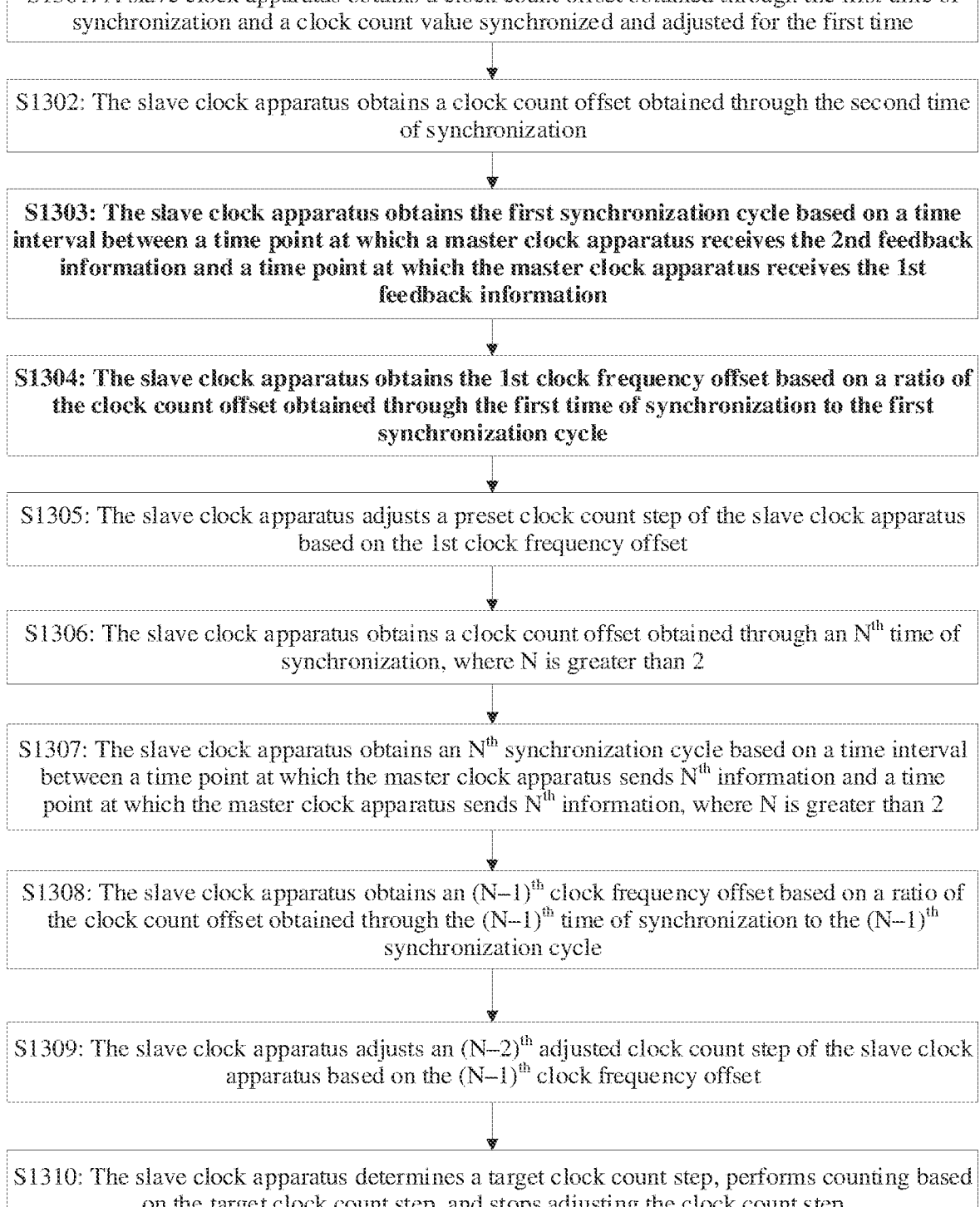

S1301: A slave clock apparatus obtains a clock count offset obtained through the first time of synchronization and a clock count value synchronized and adjusted for the first time S1302: The slave clock apparatus obtains a clock count offset obtained through the second time of synchronization

S1303: The slave clock apparatus obtains the first synchronization cycle based on a time interval between a time point at which a master clock apparatus receives the 2nd feedback information and a time point at which the master clock apparatus receives the 1st feedback information

S1304: The slave clock apparatus obtains the 1st clock frequency offset based on a ratio of the clock count offset obtained through the first time of synchronization to the first synchronization cycle

S1305: The slave clock apparatus adjusts a preset clock count step of the slave clock apparatus based on the 1st clock frequency offset S1306: The slave clock apparatus obtains a clock count offset obtained through an $N^{th}$ time of synchronization, where N is greater than 2

S1307: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2

S1308: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle S1309: The slave clock apparatus adjusts an $(N-2)^{th}$ adjusted clock count step of the slave clock apparatus based on the $(N-1)^{th}$ clock frequency offset S1310: The slave clock apparatus determines a target clock count step, performs counting based on the target clock count step, and stops adjusting the clock count step

FIG. 13

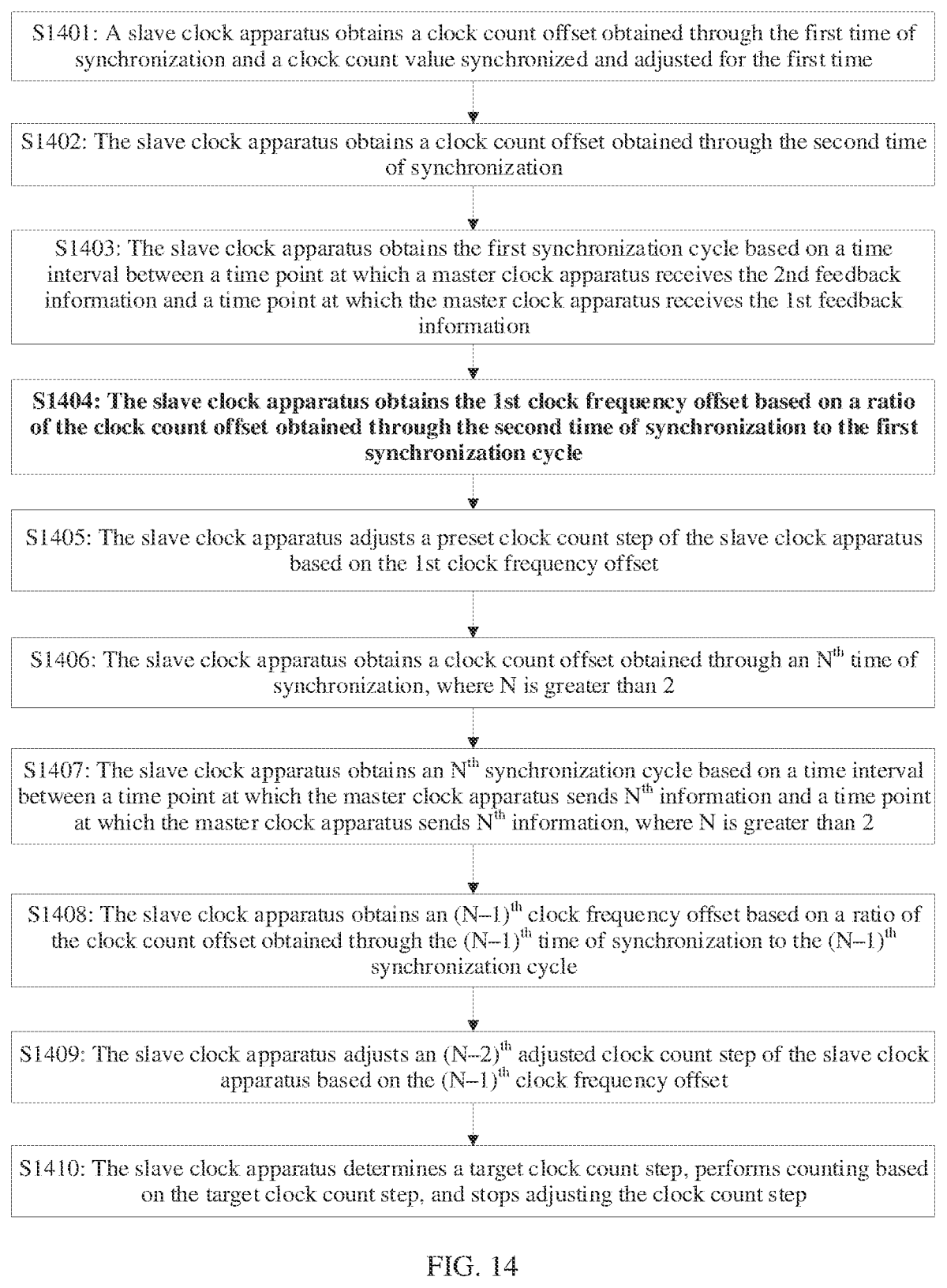

S1401: A slave clock apparatus obtains a clock count offset obtained through the first time of synchronization and a clock count value synchronized and adjusted for the first time

↓

S1402: The slave clock apparatus obtains a clock count offset obtained through the second time of synchronization

↓

S1403: The slave clock apparatus obtains the first synchronization cycle based on a time interval between a time point at which a master clock apparatus receives the 2nd feedback information and a time point at which the master clock apparatus receives the 1st feedback information

↓

S1404: The slave clock apparatus obtains the 1st clock frequency offset based on a ratio of the clock count offset obtained through the second time of synchronization to the first synchronization cycle

↓

S1405: The slave clock apparatus adjusts a preset clock count step of the slave clock apparatus based on the 1st clock frequency offset

↓

S1406: The slave clock apparatus obtains a clock count offset obtained through an $N^{th}$ time of synchronization, where N is greater than 2

↓

S1407: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2

↓

S1408: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle

↓

S1409: The slave clock apparatus adjusts an $(N-2)^{th}$ adjusted clock count step of the slave clock apparatus based on the $(N-1)^{th}$ clock frequency offset

↓

S1410: The slave clock apparatus determines a target clock count step, performs counting based on the target clock count step, and stops adjusting the clock count step

FIG. 14

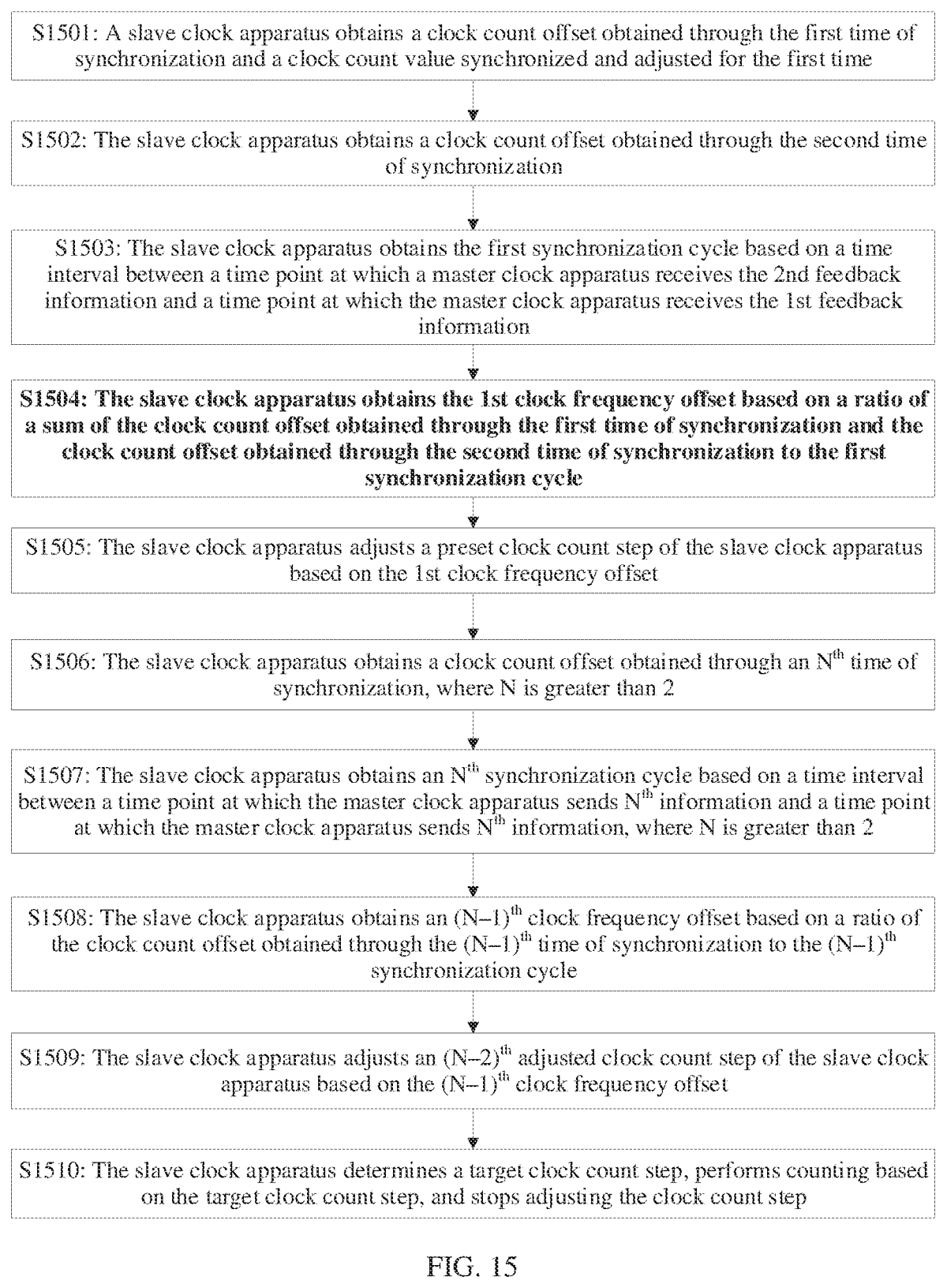

S1501: A slave clock apparatus obtains a clock count offset obtained through the first time of synchronization and a clock count value synchronized and adjusted for the first time

↓

S1502: The slave clock apparatus obtains a clock count offset obtained through the second time of synchronization

↓

S1503: The slave clock apparatus obtains the first synchronization cycle based on a time interval between a time point at which a master clock apparatus receives the 2nd feedback information and a time point at which the master clock apparatus receives the 1st feedback information

↓

S1504: The slave clock apparatus obtains the 1st clock frequency offset based on a ratio of a sum of the clock count offset obtained through the first time of synchronization and the clock count offset obtained through the second time of synchronization to the first synchronization cycle

↓

S1505: The slave clock apparatus adjusts a preset clock count step of the slave clock apparatus based on the 1st clock frequency offset

↓

S1506: The slave clock apparatus obtains a clock count offset obtained through an $N^{th}$ time of synchronization, where N is greater than 2

↓

S1507: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2

↓

S1508: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle

↓

S1509: The slave clock apparatus adjusts an $(N-2)^{th}$ adjusted clock count step of the slave clock apparatus based on the $(N-1)^{th}$ clock frequency offset

↓

S1510: The slave clock apparatus determines a target clock count step, performs counting based on the target clock count step, and stops adjusting the clock count step

FIG. 15

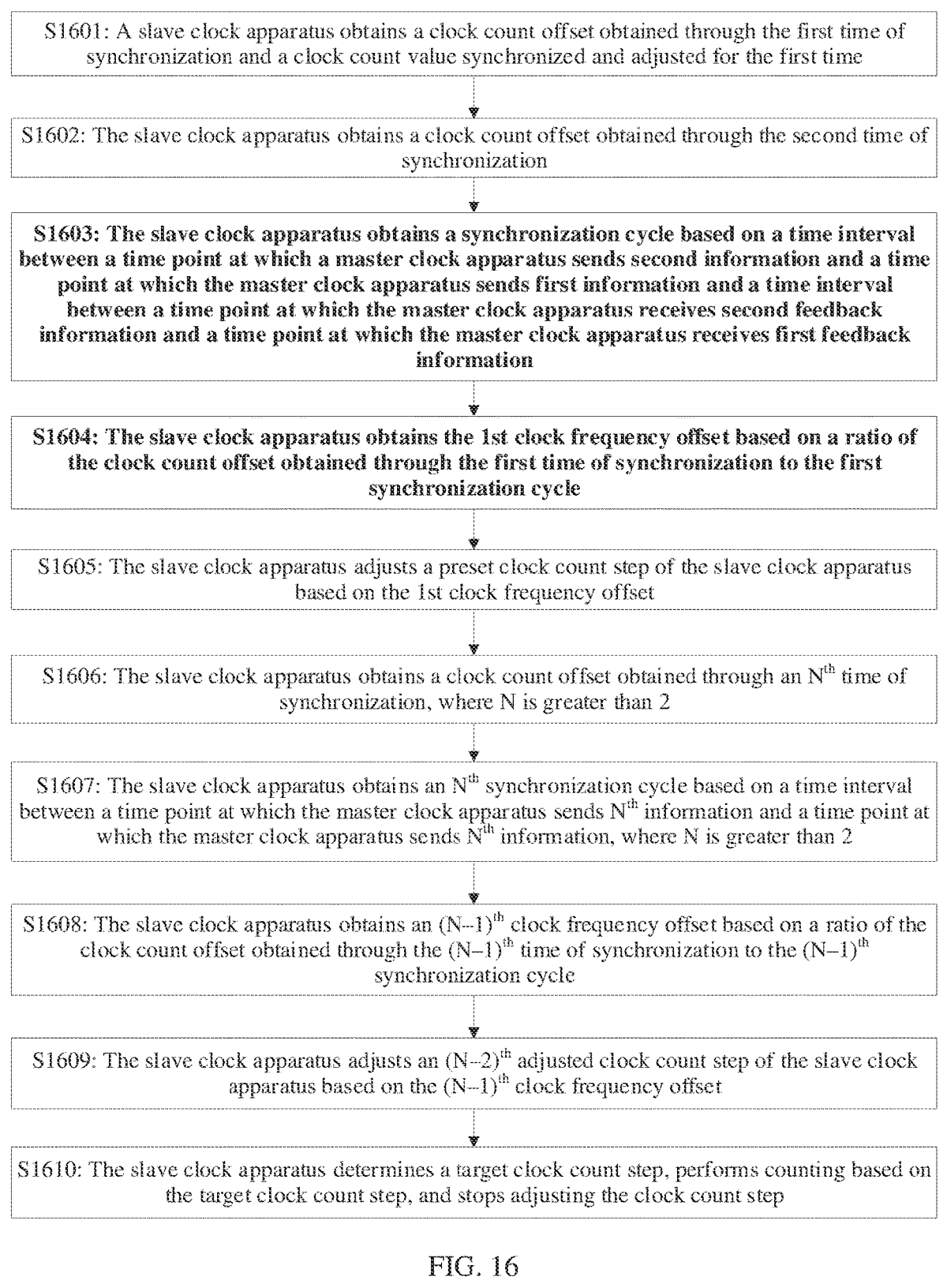

S1601: A slave clock apparatus obtains a clock count offset obtained through the first time of synchronization and a clock count value synchronized and adjusted for the first time

↓

S1602: The slave clock apparatus obtains a clock count offset obtained through the second time of synchronization

↓

S1603: The slave clock apparatus obtains a synchronization cycle based on a time interval between a time point at which a master clock apparatus sends second information and a time point at which the master clock apparatus sends first information and a time interval between a time point at which the master clock apparatus receives second feedback information and a time point at which the master clock apparatus receives first feedback information

↓

S1604: The slave clock apparatus obtains the 1st clock frequency offset based on a ratio of the clock count offset obtained through the first time of synchronization to the first synchronization cycle

↓

S1605: The slave clock apparatus adjusts a preset clock count step of the slave clock apparatus based on the 1st clock frequency offset

↓

S1606: The slave clock apparatus obtains a clock count offset obtained through an $N^{th}$ time of synchronization, where N is greater than 2

↓

S1607: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2

↓

S1608: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle

↓

S1609: The slave clock apparatus adjusts an $(N-2)^{th}$ adjusted clock count step of the slave clock apparatus based on the $(N-1)^{th}$ clock frequency offset

↓

S1610: The slave clock apparatus determines a target clock count step, performs counting based on the target clock count step, and stops adjusting the clock count step

FIG. 16

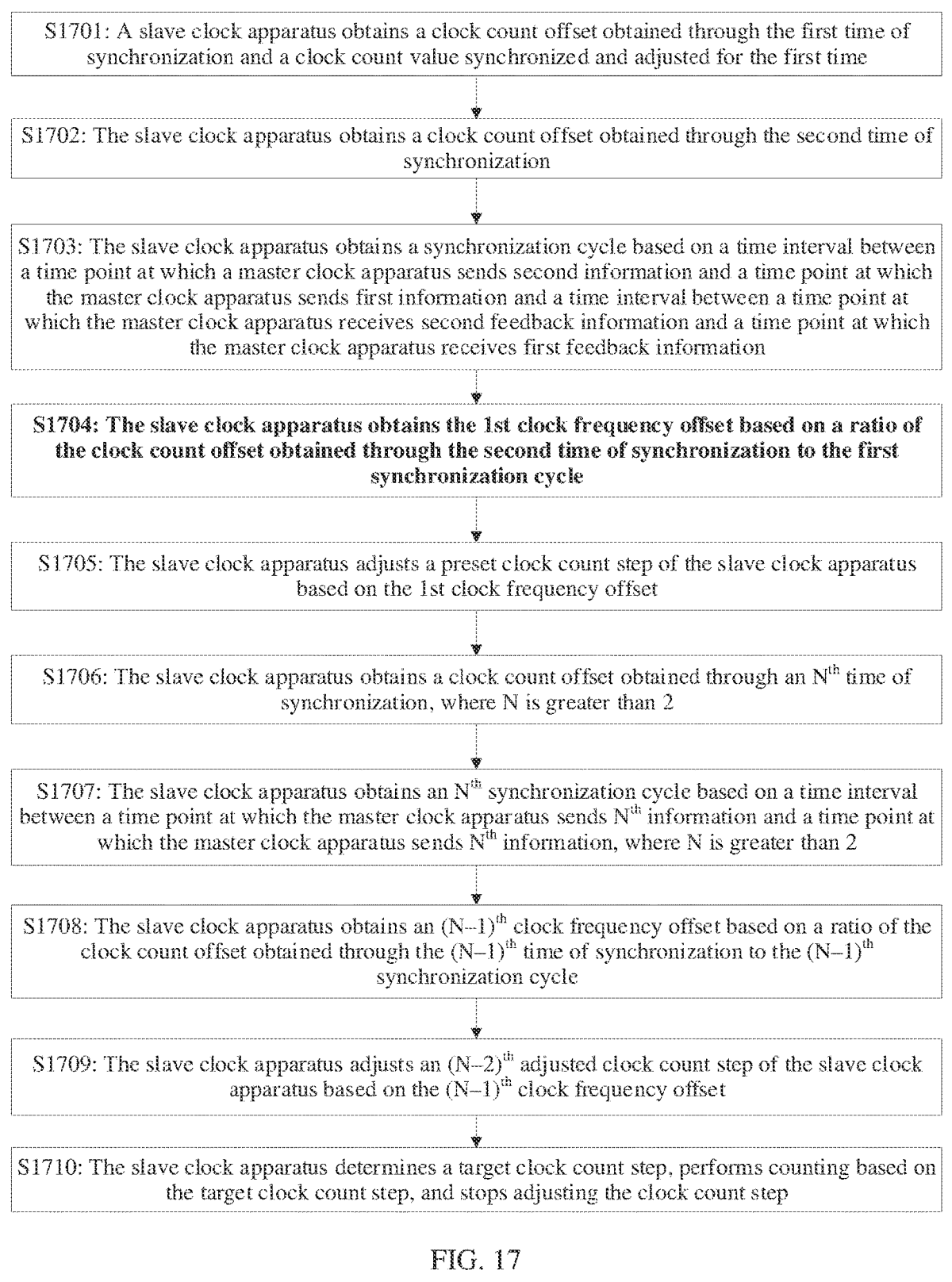

S1701: A slave clock apparatus obtains a clock count offset obtained through the first time of synchronization and a clock count value synchronized and adjusted for the first time S1702: The slave clock apparatus obtains a clock count offset obtained through the second time of synchronization S1703: The slave clock apparatus obtains a synchronization cycle based on a time interval between a time point at which a master clock apparatus sends second information and a time point at which the master clock apparatus sends first information and a time interval between a time point at which the master clock apparatus receives second feedback information and a time point at which the master clock apparatus receives first feedback information

S1704: The slave clock apparatus obtains the 1st clock frequency offset based on a ratio of the clock count offset obtained through the second time of synchronization to the first synchronization cycle

S1705: The slave clock apparatus adjusts a preset clock count step of the slave clock apparatus based on the 1st clock frequency offset S1706: The slave clock apparatus obtains a clock count offset obtained through an $N^{th}$ time of synchronization, where N is greater than 2

S1707: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2

S1708: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle S1709: The slave clock apparatus adjusts an $(N-2)^{th}$ adjusted clock count step of the slave clock apparatus based on the $(N-1)^{th}$ clock frequency offset S1710: The slave clock apparatus determines a target clock count step, performs counting based on the target clock count step, and stops adjusting the clock count step

FIG. 17

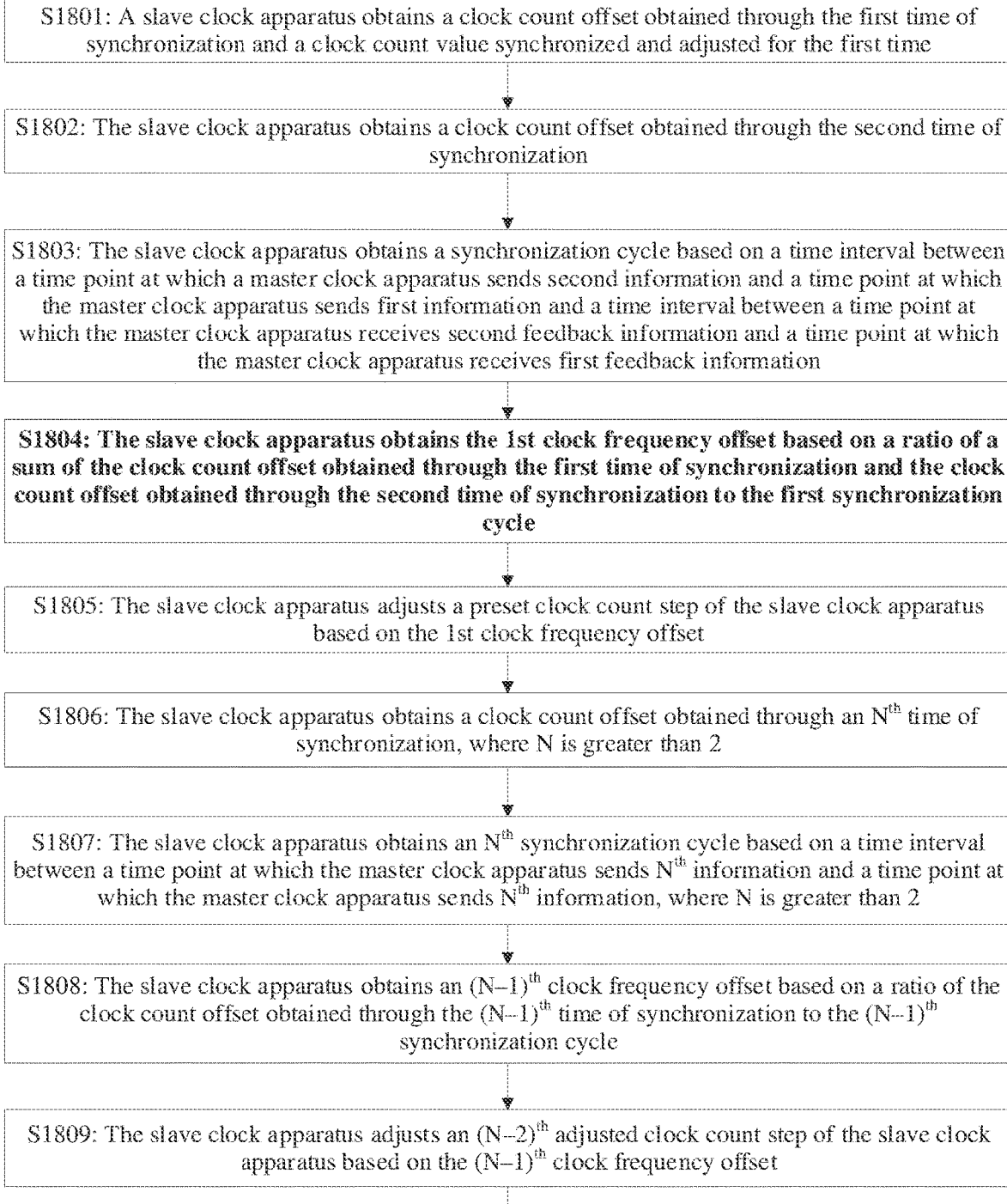

S1801: A slave clock apparatus obtains a clock count offset obtained through the first time of synchronization and a clock count value synchronized and adjusted for the first time S1802: The slave clock apparatus obtains a clock count offset obtained through the second time of synchronization S1803: The slave clock apparatus obtains a synchronization cycle based on a time interval between a time point at which a master clock apparatus sends second information and a time point at which the master clock apparatus sends first information and a time interval between a time point at which the master clock apparatus receives second feedback information and a time point at which the master clock apparatus receives first feedback information

S1804: The slave clock apparatus obtains the 1st clock frequency offset based on a ratio of a sum of the clock count offset obtained through the first time of synchronization and the clock count offset obtained through the second time of synchronization to the first synchronization cycle

S1805: The slave clock apparatus adjusts a preset clock count step of the slave clock apparatus based on the 1st clock frequency offset S1806: The slave clock apparatus obtains a clock count offset obtained through an $N^{th}$ time of synchronization, where N is greater than 2

S1807: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2

S1808: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle S1809: The slave clock apparatus adjusts an $(N-2)^{th}$ adjusted clock count step of the slave clock apparatus based on the $(N-1)^{th}$ clock frequency offset S1810: The slave clock apparatus determines a target clock count step, performs counting based on the target clock count step, and stops adjusting the clock count step

FIG. 18

CLOCK SYNCHRONIZATION METHOD, AND RELATED APPARATUS AND DEVICE

CROSS-REFERENCE TO RELATED APPLICATION

This application is a continuation of International Application No. PCT/CN2021/085937, filed on Apr. 8, 2021, the disclosure of which is hereby incorporated by reference in its entirety.

TECHNICAL FIELD

Embodiments of the present disclosure relate to the communication field, and in particular, to a clock synchronization method, and a related apparatus and device.

BACKGROUND

In existing wireless communication, working modes of a transmit end and a receive end are generally asymmetric, that is, working clocks on both sides are not synchronized, and a synchronization operation is required for correct communication. Precise synchronization between sampling clocks of the transmit end and the receive end is a prerequisite for ensuring efficient and reliable communication quality between the two parties. Therefore, in a scenario in which the working modes are asymmetric, synchronization between a master clock and a slave clock is a problem that needs to be urgently resolved.

Currently, synchronization between the master clock and the slave clock can be completed by recording a start moment of a follow-up packet. Specifically, a first moment at which a master clock apparatus sends information, a second moment at which a slave clock apparatus receives the information sent by the master clock apparatus, a third moment at which the slave clock apparatus returns feedback information to the master clock apparatus after the slave clock apparatus receives the information, and a fourth moment at which the master clock apparatus receives the feedback information returned by the slave clock apparatus are recorded, and a clock count value of the slave clock apparatus is corrected by using a difference between the second moment and the first moment and a difference between the fourth moment and the third moment, to adjust timing of the slave clock apparatus, and implement synchronization between the master clock and the slave clock. However, a current clock synchronization solution is only coarse synchronization, and clock synchronization precision is insufficient. Therefore, a clock synchronization method with high precision is urgently required.

SUMMARY

Embodiments of the present disclosure provide a clock synchronization method, and a related apparatus and device, to adjust a clock count step by using a clock count step, where the clock count step is a time length between adjacent clock count values, so as to improve clock synchronization accuracy.

According to a first aspect, the present disclosure provides a clock synchronization method. The method may be performed by a clock synchronization apparatus, or may be performed by a chip configured in a clock synchronization apparatus. This is not limited in the present disclosure. The method includes: A slave clock apparatus obtains a first time point at which a master clock apparatus sends first information, a second time point at which the slave clock apparatus receives the first information from the master clock apparatus, a third time point at which the slave clock apparatus sends first feedback information, and a fourth time point at which the master clock apparatus receives the first feedback information from the slave clock apparatus, where the first feedback information is generated based on the first information. Then, the slave clock apparatus obtains a first clock count offset based on the first time point, the second time point, the third time point, and the fourth time point, where the first clock count offset is used to indicate a difference between a clock count value of the slave clock apparatus and a clock count value of the master clock apparatus. Then, the slave clock apparatus obtains a first clock frequency offset based on the first clock count offset, where the first clock frequency offset is a difference between a clock count frequency of the slave clock apparatus and a clock count frequency of the master clock apparatus. Finally, the slave clock apparatus adjusts a clock count step of the slave clock apparatus based on the first clock frequency offset, where the clock count step is a time length between adjacent clock count values.

In this implementation, the obtained time points at which the master clock apparatus sends information and receives feedback information and the obtained time points at which the slave clock apparatus receives information and sends feedback information are used to obtain the first clock count offset that can indicate the difference between the clock count value of the slave clock apparatus and the clock count value of the master clock apparatus, and the first clock frequency offset is obtained based on the first clock count offset. Because the first clock frequency offset is the difference between the clock count frequency of the slave clock apparatus and the clock count frequency of the master clock apparatus, that is, because the first clock frequency offset can reflect an offset between adjacent clock count values of the slave clock apparatus and adjacent clock count values of the master clock apparatus, the first clock frequency offset may be used to adjust the clock count step. Because the first clock frequency offset can be used to adjust the clock count step, and the clock count step is a time length between adjacent clock count values, the time length between adjacent clock count values can be adjusted, so that an offset between a time length between adjacent clock count values recorded by the slave clock apparatus and a time length between adjacent clock count values recorded by the master clock apparatus is small, thereby improving clock synchronization accuracy.

In an optional implementation of the present disclosure, the slave clock apparatus may further obtain, based on the first clock count offset, an adjusted fifth time point at which the slave clock apparatus receives second information from the master clock apparatus and an adjusted sixth time point at which the slave clock apparatus sends second feedback information, where the second information is adjacent to the first information, and the second feedback information is generated based on the second information.

In this implementation, the slave clock apparatus can adjust the time length between adjacent clock count values, and can also adjust, by using the clock count offset, the time points at which the slave clock apparatus receives information and sends feedback information. Based on this, because clock synchronization is an important factor for measuring communication quality, high communication quality indicates that clock synchronization accuracy is high. In addition, communication quality is affected when an offset is generated between clock count values and an offset is generated between clock count steps. Therefore, it can be learned that both the clock count value and the clock count step can affect clock synchronization accuracy. The clock count value is a time point at which information is sent/received, and the clock count step is a time length between adjacent clock count values. Therefore, on the basis of improving accuracy of the clock count step, accuracy of the clock count value can be further improved, thereby further improving clock synchronization accuracy. For example, the slave clock apparatus records a clock count value at an interval of 60 milliseconds (ms). In this case, the clock count step of the slave clock apparatus is 60 ms. If there is an interval of N clock count values between two adjacent pieces of information received by the slave clock apparatus, it indicates that a time length of the interval between receiving the two adjacent pieces of information by the slave clock apparatus is N*60 ms.

In an optional implementation of the present disclosure, the slave clock apparatus can further obtain a seventh time point at which the master clock apparatus sends the second information and an eighth time point at which the master clock apparatus receives the second feedback information from the slave clock apparatus. Based on this, the slave clock apparatus can obtain a second clock count offset based on the adjusted fifth time point, the adjusted sixth time point, the seventh time point, and the eighth time point, and the slave clock apparatus obtains the first clock frequency offset based on the first clock count offset and/or the second clock count offset. That is, the slave clock apparatus can obtain the first clock frequency offset based on the first clock count offset, or obtain the first clock frequency offset based on the second clock count offset, or obtain the first clock frequency offset based on the first clock count offset and the second clock count offset.

In this implementation, the slave clock apparatus can obtain the clock frequency offset through calculation by using two adjacent clock count offsets, or obtain the clock frequency offset through calculation by using one clock count offset, so that a calculated value of the clock frequency offset can be flexibly determined based on a specific scenario, thereby improving feasibility and flexibility of this solution.

In an optional implementation of the present disclosure, the slave clock apparatus can obtain a synchronization cycle based on a time interval between the time point at which the master clock apparatus sends the second information and the time point at which the master clock apparatus sends the first information, where the synchronization cycle is used to adjust the clock count step of the slave clock apparatus; or the slave clock apparatus obtains the synchronization cycle based on a time interval between the time point at which the master clock apparatus receives the second feedback information and the time point at which the master clock apparatus receives the first feedback information; or the slave clock apparatus obtains the synchronization cycle based on a time interval between the time point at which the master clock apparatus sends the second information and the time point at which the master clock apparatus sends the first information and a time interval between the time point at which the master clock apparatus receives the second feedback information and the time point at which the master clock apparatus receives the first feedback information.

In this implementation, because the slave clock apparatus needs to perform clock synchronization with the master clock apparatus, the slave clock apparatus determines the synchronization cycle based on a time interval at which the master clock apparatus sends adjacent information and/or a time interval at which the master clock apparatus receives adjacent feedback information, that is, a time interval at which the master clock apparatus performs a same step is used as the synchronization cycle, so that the slave clock apparatus can be further synchronized with the master clock apparatus in terms of synchronization cycle, thereby further improving clock synchronization accuracy.

In an optional implementation of the present disclosure, the first clock frequency offset is a ratio of the first clock count offset to the synchronization cycle, or the first clock frequency offset is a ratio of the second clock count offset to the synchronization cycle, or the first clock frequency offset is a ratio of a sum of the first clock count offset and the second clock count offset to the synchronization cycle.

In this implementation, the first clock frequency offset is specifically obtained by using the ratio of the first clock count offset and/or the second clock count offset to the foregoing synchronization cycle. Therefore, the first clock frequency offset can be calculated in a plurality of different manners, thereby improving flexibility of the first clock frequency offset, and improving feasibility and flexibility of this solution.

In an optional implementation of the present disclosure, when a quantity of adjustment times of the clock count step is equal to a synchronization times threshold, the slave clock apparatus determines an adjusted clock count step as a target clock count step; and then performs counting based on the target clock count step, and stops adjusting the clock count step. Alternatively, in another case, when the clock frequency offset is less than a minimum clock frequency offset threshold, the slave clock apparatus determines, as a target clock count step, a clock count step whose clock frequency offset is less than the minimum clock frequency offset threshold; and then performs counting based on the target clock count step, and stops adjusting the clock count step. Alternatively, in still another case, when the clock frequency offset is greater than a maximum clock frequency offset threshold, the slave clock apparatus performs clock synchronization again.

In this implementation, when the quantity of adjustment times of the clock count step is equal to the synchronization times threshold, that is, when the quantity of times reaches the synchronization times threshold determined through experiment and/or statistic collection performed based on a large amount of data, the adjusted clock count step should reach an offset range acceptable by the slave clock apparatus. Therefore, adjustment of the clock count step can be stopped, and a clock count step existing when a condition is met is used as a count step for subsequent counting, thereby reducing consumption of adjusting the clock count step for a plurality of times. In addition, when the clock frequency offset is less than the minimum clock frequency offset threshold, it indicates that the clock frequency offset has reached an acceptable offset range of clock synchronization. In this case, adjustment of the clock count step is also stopped, and a clock count step existing when a condition is met is used as a count step for subsequent counting, so that consumption of adjusting the clock count step for a plurality of times can also be reduced. Furthermore, when the clock frequency offset is greater than the maximum clock frequency offset threshold, it indicates that the clock frequency offset is excessively large. Therefore, clock synchronization needs to be performed again, to avoid a case in which a clock count step obtained through adjustment is inaccurate because a clock frequency with an excessively large offset continues to be used for subsequent calculation, and avoid consumption of inaccurately adjusting the clock count step for a plurality of times. This also ensures clock synchronization accuracy.

According to a second aspect, the present disclosure provides a clock synchronization apparatus, where the clock synchronization apparatus includes:

a communication module, configured to obtain a first time point at which a master clock apparatus sends first information, a second time point at which a slave clock apparatus receives the first information from the master clock apparatus, a third time point at which the slave clock apparatus sends first feedback information, and a fourth time point at which the master clock apparatus receives the first feedback information from the slave clock apparatus, where the first feedback information is generated based on the first information; and a processing module, configured to obtain a first clock count offset based on the first time point, the second time point, the third time point, and the fourth time point, where the first clock count offset is used to indicate a difference between a clock count value of the slave clock apparatus and a clock count value of the master clock apparatus, where the processing module is further configured to obtain a first clock frequency offset based on the first clock count offset, where the first clock frequency offset is a difference between a clock count frequency of the slave clock apparatus and a clock count frequency of the master clock apparatus; and the processing module is further configured to adjust a clock count step of the slave clock apparatus based on the first clock frequency offset, where the clock count step is a time length between adjacent clock count values.

In an optional implementation of the present disclosure, the communication module is further configured to obtain, based on the first clock count offset, an adjusted fifth time point at which the slave clock apparatus receives second information from the master clock apparatus and an adjusted sixth time point at which the slave clock apparatus sends second feedback information, where the second information is adjacent to the first information, and the second feedback information is generated based on the second information.

In an optional implementation of the present disclosure, the communication module is further configured to obtain a seventh time point at which the master clock apparatus sends the second information and an eighth time point at which the master clock apparatus receives the second feedback information from the slave clock apparatus; and the processing module is specifically configured to: obtain a second clock count offset based on the adjusted fifth time point, the adjusted sixth time point, the seventh time point, and the eighth time point; and obtain the first clock frequency offset based on the first clock count offset and/or the second clock count offset.

In an optional implementation of the present disclosure, the processing module is further configured to obtain a synchronization cycle based on a time interval between the time point at which the master clock apparatus sends the second information and the time point at which the master clock apparatus sends the first information, where the synchronization cycle is used to adjust the clock count step of the slave clock apparatus; or the processing module is further configured to obtain the synchronization cycle based on a time interval between the time point at which the master clock apparatus receives the second feedback information and the time point at which the master clock apparatus receives the first feedback information; or the processing module is further configured to obtain the synchronization cycle based on a time interval between the time point at which the master clock apparatus sends the second information and the time point at which the master clock apparatus sends the first information and a time interval between the time point at which the master clock apparatus receives the second feedback information and the time point at which the master clock apparatus receives the first feedback information.

In an optional implementation of the present disclosure, the first clock frequency offset is a ratio of the first clock count offset to the synchronization cycle, or the first clock frequency offset is a ratio of the second clock count offset to the synchronization cycle, or the first clock frequency offset is a ratio of a sum of the first clock count offset and the second clock count offset to the synchronization cycle.

In an optional implementation of the present disclosure, the processing module is further configured to: when a quantity of adjustment times of the clock count step is equal to a synchronization times threshold, determine an adjusted clock count step as a target clock count step; and the processing module is further configured to: perform counting based on the target clock count step, and stop adjusting the clock count step; or the processing module is further configured to: when the clock frequency offset is less than a minimum clock frequency offset threshold, determine, as a target clock count step, a clock count step whose clock frequency offset is less than the minimum clock frequency offset threshold; and the processing module is further configured to: perform counting based on the target clock count step, and stop adjusting the clock count step; or the processing module is further configured to: when the clock frequency offset is greater than a maximum clock frequency offset threshold, perform clock synchronization again.

According to a third aspect, the present disclosure provides a clock synchronization device, including a processor. The processor is coupled to a memory, and may be configured to execute instructions in the memory, to implement the method according to any one of the possible implementations of the first aspect. Optionally, the terminal device further includes a memory. Optionally, the terminal device further includes a communication interface, the processor is coupled to the communication interface, the communication interface is configured to input and/or output information, and the information includes at least one of instructions and data. It should be understood that the communication interface may be implemented by using same hardware logic, or may be implemented by using different hardware logic. For example, one hardware interface may have only an input function or an output function, or one hardware interface may have both an input function and an output function.

In another implementation, the terminal device is a chip or a chip system that is configured in the clock synchronization device. When the terminal device is a chip or a chip system that is configured in the clock synchronization device, the communication interface may be an input/output interface, an interface circuit, an output circuit, an input circuit, a pin, a related circuit, or the like. The processor may alternatively be embodied as a processing circuit or a logic circuit.

In a specific implementation process, the memory may be a non-transitory memory, for example, a read-only memory (ROM). The memory and the processor may be integrated into a same chip, or may be separately disposed on different chips. A type of the memory and a manner in which the memory and the processor are disposed are not limited in this embodiment.

It should be understood that a related information exchange process, for example, a message sending process may be a process of outputting a message from the processor, and a message receiving process may be a process of inputting a received message to the processor. Specifically, the information output by the processor may be output to a transmitter, and the input information received by the processor may be from a receiver. The transmitter and the receiver may be collectively referred to as a transceiver.

According to a fourth aspect, the present disclosure provides a processor, including an input circuit, an output circuit, and a processing circuit. The processing circuit is configured to: receive a signal by using the input circuit, and transmit a signal by using the output circuit, so that the processor performs the method according to any one of the possible implementations of the first aspect.

In a specific implementation process, the processor may be a chip, the input circuit may be an input pin, the output circuit may be an output pin, and the processing circuit may be a transistor, a gate circuit, a trigger, various logic circuits, and the like. An input signal received by the input circuit may be, for example, but not limited to, received and input by a receiver, a signal output by the output circuit may be, for example, but not limited to, output to a transmitter and transmitted by the transmitter, and the input circuit and the output circuit may be a same circuit, where the circuit is used as the input circuit and the output circuit at different moments. Specific implementations of the processor and various circuits are not limited in this embodiment of the present disclosure.

According to a fifth aspect, the present disclosure provides a computer program product, where the computer program product includes a computer program (which may also be referred to as code or instructions), and when the computer program is run, a computer is enabled to perform the method according to any one of the possible implementations of the first aspect, or perform the method according to any one of the possible implementations of the second aspect.

According to a sixth aspect, the present disclosure provides a computer-readable storage medium, where the computer-readable storage medium stores a computer program (which may also be referred to as code or instructions), and when the computer program is run on a computer, the computer is enabled to perform the method according to any one of the possible implementations of the first aspect.

According to a seventh aspect, the present disclosure provides a non-volatile computer-readable storage medium, where the non-volatile computer-readable storage medium stores a computer program (which may also be referred to as code or instructions), and when the computer program is run on a computer, the computer is enabled to perform the method according to any one of the possible implementations of the first aspect.

According to an eighth aspect, the present disclosure provides a chip system, where the chip system includes a processor and an interface, the interface is configured to obtain a program or instructions, and the processor is configured to invoke the program or the instructions to implement or support a clock synchronization device in implementing the function in the first aspect.

In a possible design, the chip system further includes a memory. The memory is configured to store program instructions and data that are necessary for the clock synchronization device. The chip system may include a chip, or may include a chip and another discrete device.

It should be noted that, for beneficial effects brought by the implementations of the second aspect to the eighth aspect of the present disclosure, refer to the implementations of the first aspect. Therefore, details are not repeated.

BRIEF DESCRIPTION OF DRAWINGS

FIG. 2 is a schematic diagram of an embodiment of a clock synchronization method according to an embodiment of the present disclosure;

FIG. 9 is a schematic diagram of another embodiment of a clock synchronization method according to an embodiment of the present disclosure;

FIG. 11 is a schematic diagram of another embodiment of a clock synchronization method according to an embodiment of the present disclosure;

FIG. 12 is a schematic diagram of another embodiment of a clock synchronization method according to an embodiment of the present disclosure;

FIG. 13 is a schematic diagram of another embodiment of a clock synchronization method according to an embodiment of the present disclosure;

FIG. 14 is a schematic diagram of another embodiment of a clock synchronization method according to an embodiment of the present disclosure;

FIG. 15 is a schematic diagram of another embodiment of a clock synchronization method according to an embodiment of the present disclosure;

FIG. 16 is a schematic diagram of another embodiment of a clock synchronization method according to an embodiment of the present disclosure;

FIG. 17 is a schematic diagram of another embodiment of a clock synchronization method according to an embodiment of the present disclosure;

FIG. 18 is a schematic diagram of another embodiment of a clock synchronization method according to an embodiment of the present disclosure;

DESCRIPTION OF EMBODIMENTS

Figure 1:
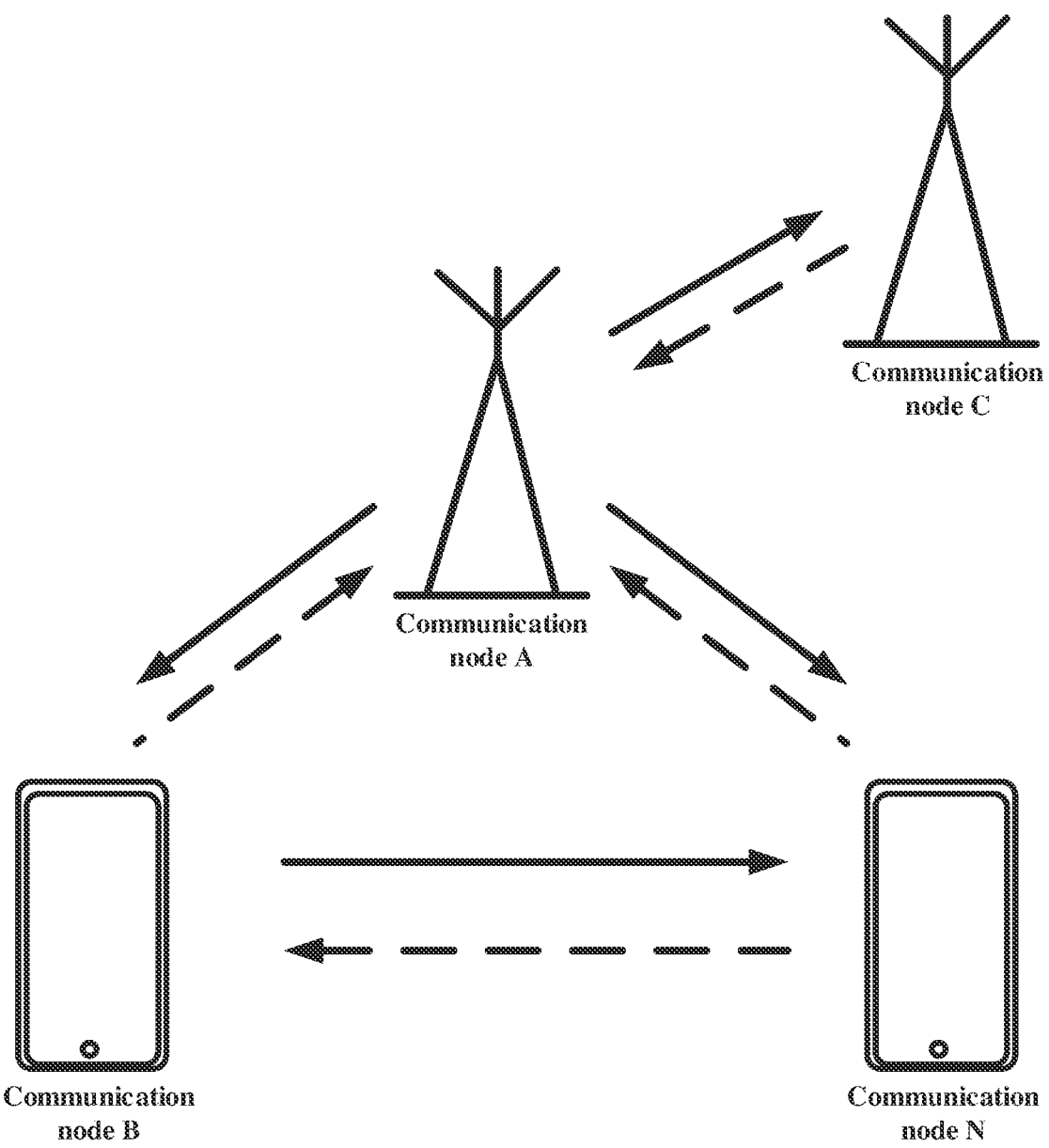
FIG. 1 is a schematic diagram of a system framework according to an embodiment of the present disclosure.

The following describes technical solutions in the present disclosure with reference to the accompanying drawings.

The technical solutions in the embodiments of the present disclosure may be applied to various communication systems, for example, a long term evolution (LTE) system, an LTE frequency division duplex (FDD) system, an LTE time division duplex (TDD) system, and a universal mobile telecommunications system (UMTS). With continuous development of the communication systems, the technical solutions in the present disclosure may be applied to a 5th generation (5G) system or new radio (NR), or may be applied to a future network such as a 6G system or even a future system, or may be applied to a device to device (D2D) system, a machine to machine (M2M) system, or the like.

To help further understand the embodiments of the present disclosure, the following descriptions are further provided.

First, in the present disclosure, for ease of description, when numbering is performed, consecutive numbering may start from 0.

It should be understood that the foregoing descriptions are all provided to help describe the technical solutions provided in the embodiments of the present disclosure, but are not intended to limit the scope of the present disclosure.

Second, in the embodiments shown below, for one type of technical feature, "first", "second", "third", and the like are used to distinguish between technical features in the type of technical feature, and there is no order of precedence or order of magnitude between the technical features described by "first", "second", and "third".

Third, "at least one" indicates one or more, and "a plurality of" indicates two or more. A term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between associated objects. "At least one of the following items" or a similar expression thereof refers to any combination of these items, including any combination of singular items or plural items. For example, at least one of a, b, and c may represent: a, b, c, a and b, a and c, b and c, or a, b, and c. At least one of a, b, or c may represent: a, b, c, a and b, a and c, b and c, or a, b and c, where a, b, and c each may be singular or plural.

Fourth, the embodiments disclosed in the present disclosure present aspects, embodiments, or features of the present disclosure around a system including a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

Fifth, in the embodiments disclosed in the present disclosure, "of", "relevant", and "corresponding" may be mixed sometimes. It should be noted that, when a difference between the terms is not emphasized, meanings expressed by the terms are consistent.

In existing wireless communication, working modes of a transmit end and a receive end are generally asymmetric, that is, working clocks on both sides are not synchronized, and a synchronization operation is required for correct communication. Precise synchronization between sampling clocks of the transmit end and the receive end is a prerequisite for ensuring efficient and reliable communication quality between the two parties. Therefore, in a scenario in which the working modes are asymmetric, synchronization between a master clock and a slave clock is a problem that needs to be urgently resolved. Currently, synchronization between the master clock and the slave clock can be completed by recording a start moment of a follow-up packet. Specifically, a first moment at which a master clock apparatus sends information, a second moment at which a slave clock apparatus receives the information sent by the master clock apparatus, a third moment at which the slave clock apparatus returns feedback information to the master clock apparatus after the slave clock apparatus receives the information, and a fourth moment at which the master clock apparatus receives the feedback information returned by the slave clock apparatus are recorded, and a clock count value of the slave clock apparatus is corrected by using a difference between the second moment and the first moment and a difference between the fourth moment and the third moment, to adjust timing of the slave clock apparatus, and implement synchronization between the master clock and the slave clock. However, a current clock synchronization solution is only coarse synchronization, and clock synchronization precision is insufficient. Therefore, a clock synchronization method with high precision is urgently required.

To resolve the foregoing problem, the embodiments of the present disclosure provide a clock synchronization method, and a related apparatus and device, to adjust a clock count step by using a clock count step, so as to improve clock synchronization accuracy. For ease of understanding, a system architecture of a communication system used in the embodiments of the present disclosure is first described. In the present disclosure, at least two communication nodes may form a communication system, a clock of one communication node is used as a master reference clock, and another communication node performs clock synchronization with the communication node that has the master reference clock. It should be understood that the communication node in the communication system in the present disclosure may be understood as the network device or the terminal device described above. This is not limited herein.

Based on this, FIG. 1 is a schematic diagram of a system framework according to an embodiment of the present disclosure. As shown in FIG. 1, a communication node A, a communication node B, and a communication node C to a communication node N form a communication system, and a clock of the communication node A is used as a master reference clock, that is, the communication node A is a master clock communication node. In this case, the communication node B, and the communication node C to the communication node N need to perform clock synchronization with the communication node A. The communication node B is used as an example for description. First, the communication node A initiates synchronization measurement. After each time of measurement is completed, the communication node B may obtain a time point at which the communication node A sends information and a time point at which the communication node A receives feedback information (which is obtained by the communication node B based on the foregoing information), and the communication node B may also record a time point at which the information sent by the communication node A is received and a time point at which the feedback information is sent, so that a clock count offset can be obtained. The clock count offset is used to indicate a difference between clock count values of the communication node B and the communication node A, and a time point obtained by the communication node B through a next time of measurement can be adjusted based on the clock count offset. Next, a clock frequency offset can be further obtained based on the clock count offset. The clock frequency offset is a difference between a clock count frequency of the communication node B and a clock count frequency of the communication node A. In this case, the communication node B can adjust a clock count step of the communication node B based on the obtained clock frequency offset. The clock count step is a time length between adjacent clock count values. For example, if the communication node A records a clock count value 1, and records a clock count value 2 adjacent to the clock count value 1 after 60 milliseconds (ms), a clock count step of the communication node A is 60 ms. Furthermore, if the communication node B records a clock count value 1, and records a clock count value 2 adjacent to the clock count value 1 after 59 ms, a clock count step of the communication node B is 59 ms. That is, there is an offset between a time length between adjacent clock count values of the communication node A and a time length between adjacent clock count values of the communication node B. In this case, the communication node B adjusts the clock count step (59 ms) of the communication node B by using the obtained clock frequency offset, to complete synchronization of the clock count value and the clock count step, thereby improving clock synchronization accuracy.

In an example embodiment, the communication node B completes calculation of the clock count offset and/or the clock frequency offset by using software, that is, calculates the clock count offset by using software. Based on this, the software configures, on hardware, the clock count offset and/or the clock frequency offset that are/is obtained through calculation. Specifically, the clock count value and/or the clock count step are/is adjusted by using a register transfer level (RTL) circuit, that is, the clock count value and/or the clock count step are/is adjusted by using hardware. In an optional case, in this embodiment, a dedicated processor is used for processing in a clock synchronization process.

In addition, the clock synchronization method provided in the present disclosure is not limited to synchronization of a crystal oscillator clock of an analog-to-digital conversion (Analog/Digital, A/D) interface at a physical layer (PHY), and is also applicable to clock synchronization at another communication layer in the wireless communication field. In addition, the clock synchronization method provided in the present disclosure is jointly completed by communication nodes that perform clock synchronization. Calculation of the clock count offset and/or the clock frequency offset depends on software, and hardware only needs to adjust the clock count value and/or the clock count step based on a result obtained through calculation, so that only a few hardware logic resources are required, and the method is adapted to a current existing standard. In this way, a high-precision synchronization result can be obtained through low-complexity calculation under a condition of limited hardware logical resources, to implement time synchronization in a communication network.

It should be understood that the communication node in the communication system may be a network device or a terminal device. The network device may be any device having a wireless transceiving function or a chip that can be disposed in the device. The device includes but is not limited to: an evolved NodeB (eNB), a radio network controller (Radio Network Controller, RNC), a NodeB (NB), a base station, a base station controller (BSC), a base transceiver station (BTS), a home NodeB (for example, a home evolved NodeB or a home NodeB, HNB), a baseband unit (BBU), or an access point (AP), a wireless relay node, a wireless backhaul node, a transmission point (TP), a transmission reception point (TRP), or the like in a wireless fidelity (WIFI) system. Specifically, the foregoing base station is a public mobile communication base station, is an interface device used by a mobile device to access the Internet, is also a form of a radio station, and is a radio transceiver station that transfers information to a mobile phone terminal in a specific radio coverage area by using a mobile communication switching center.

In addition, the network device may be a device used in 5G, 6G, or even a future system, for example, a gNB or a transmission point (TRP or TP) in an NR system, or one or a group (including a plurality of antenna panels) of antenna panels of a base station in a 5G system, or may be a network node that forms a gNB or a transmission point, for example, a baseband unit (BBU), a distributed unit (DU), a pico base station (Picocell), a femto base station (Femtocell), or a roadside unit (RSU) in a vehicle-to-everything (V2X) or intelligent driving scenario.

In some deployments, the gNB may include a centralized unit (CU) and a DU. The gNB may further include a radio frequency unit (radio unit, RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical layer (PHY). Information at the RRC layer finally becomes information at the PHY layer, or is converted from information at the PHY layer. Therefore, in the architecture, higher layer signaling such as RRC layer signaling or PDCP layer signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

Furthermore, in the embodiments disclosed in the present disclosure, a serving cell and a neighboring cell may be cells corresponding to a 5G NR base station, and the cell may belong to a macro base station, or may belong to a base station corresponding to a small cell. The small cell herein may include a metro cell, a micro cell, a pico cell, a femto cell, or the like. This is not limited herein.

In the embodiments disclosed in the present disclosure, an apparatus configured to implement a function of the network device may be a network device, or may be an apparatus that can support the network device in implementing the function, for example, a chip system. The apparatus may be mounted in the network device.

It should also be understood that the terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in the embodiments of the present disclosure may be a mobile phone, a tablet computer (Pad), a computer with a wireless transceiving function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a wireless terminal or an RSU of a wireless terminal type in the foregoing V2X vehicle-to-everything, or the like. The application scenario is not limited in the embodiments of the present disclosure.

The foregoing mainly describes the communication system in the embodiments of the present disclosure. The following describes in detail the solutions provided in the embodiments of the present disclosure from the perspective of the method. The master clock apparatus in this embodiment is the communication node that is used as the master reference clock and that is described in the foregoing descriptions, and the slave clock apparatus is the communication node that is used as a communication node that performs clock synchronization with the communication node having the master reference clock and that is described in the foregoing descriptions. FIG. 2 is a schematic diagram of an embodiment of a clock synchronization method according to an embodiment of the present disclosure. As shown in FIG. 2, specific steps of the clock synchronization method are as follows:

Step S201: A slave clock apparatus obtains a first time point at which a master clock apparatus sends first information, a second time point at which the slave clock apparatus receives the first information from the master clock apparatus, a third time point at which the slave clock apparatus sends first feedback information, and a fourth time point at which the master clock apparatus receives the first feedback information from the slave clock apparatus.

In this embodiment, the slave clock apparatus obtains, through measurement, the first time point at which the master clock apparatus sends the first information, and records the second time point at which the slave clock apparatus receives the first information from the master clock apparatus. Then, the slave clock apparatus generates the first feedback information based on the first information, sends the first feedback information to the master clock apparatus, records the third time point at which the slave clock apparatus sends the first feedback information, and obtains, through measurement, the fourth time point at which the master clock apparatus receives the first feedback information from the slave clock apparatus.

Figure 3:
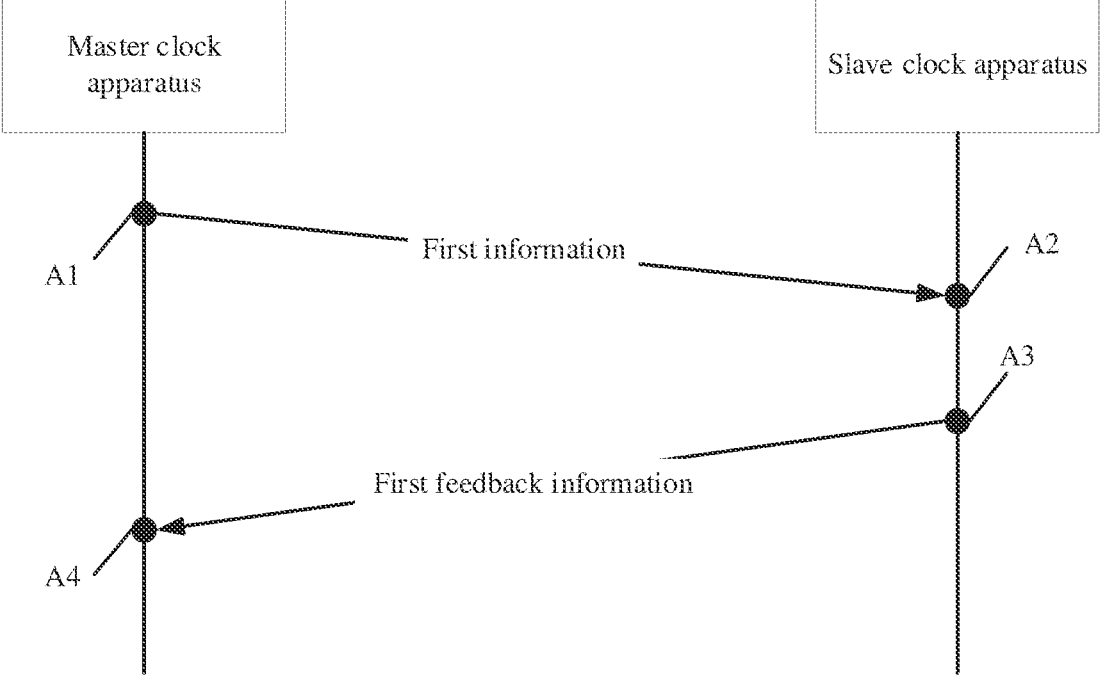
FIG. 3 is a schematic diagram of an embodiment of a time point according to an embodiment of the present disclosure.

For ease of understanding, FIG. 3 is a schematic diagram of an embodiment of a time point according to an embodiment of the present disclosure. As shown in FIG. 3, A1 indicates the first time point at which the master clock apparatus sends the first information, A2 indicates the second time point at which the clock apparatus receives the first information from the master clock apparatus, A3 indicates the third time point at which the slave clock apparatus sends the first feedback information, and A4 indicates the fourth time point at which the master clock apparatus receives the first feedback information from the slave clock apparatus. It should be understood that the example in FIG. 3 is merely used to understand this solution, and a specific time point needs to be flexibly determined based on an actual situation.

Step S202: The slave clock apparatus obtains a first clock count offset based on the first time point, the second time point, the third time point, and the fourth time point.

In this embodiment, the slave clock apparatus obtains the first clock count offset through calculation based on the first time point, the second time point, the third time point, and the fourth time point that are obtained in step S202. The first clock count offset is used to indicate a difference between a clock count value of the slave clock apparatus and a clock count value of the master clock apparatus when the first information is sent and the first feedback information is received this time. The slave clock apparatus specifically calculates a time interval between the second time point and the first time point, then calculates a time interval between the third time point and the fourth time point, and obtains the first clock count offset by taking half of a difference between the two time intervals. For ease of understanding, the following describes, by using Formula (1), how to obtain the first clock count offset:

$$\text{clk\_offset}_{N-1} = \frac{(T_{2\_N-1} - T_{1\_N-1}) - (T_{4\_N-1} - T_{3\_N-1})}{2} \qquad (1)$$

where $\text{clk\_offset}_{N-1}$ is the first clock count offset, $T_{1\_N\text{-}1}$ is the first time point, $T_{2\_N\text{-}1}$ is the second time point, $T_{3\_N\text{-}1}$ is the third time point, $T_{4\_N\text{-}1}$ is the fourth time point, and N≥2.

Step S203: The slave clock apparatus obtains, based on the first clock count offset, an adjusted fifth time point at which the slave clock apparatus receives second information from the master clock apparatus and an adjusted sixth time point at which the slave clock apparatus sends second feedback information, and obtains a seventh time point at which the master clock apparatus sends the second information and an eighth time point at which the master clock apparatus receives the second feedback information from the slave clock apparatus.

In this embodiment, the first clock count offset in step S202 is used to adjust a time point at which the slave clock apparatus receives a next piece of information adjacent to the first information, and adjust a time point at which the slave clock apparatus sends a next piece of feedback information adjacent to the first feedback information. That is, the slave clock apparatus adjusts the clock count value of the slave clock apparatus based on the first clock count offset. For ease of understanding, the following describes, by using Formula (2), how to adjust the clock count value of the slave clock apparatus:

$$FTM'_{N-1} = FTM_{N-1} - \text{clk\_offset}_{N-1} \qquad (2)$$

where $\text{clk\_offset}_{N-1}$ is the first clock count offset, $FTM_{N-1}$ is a clock count value that is of the slave clock apparatus and that exists before adjustment is performed based on the first clock count offset, and $$FTM'_{N-1}$$

is a clock count value adjusted based on the first clock count offset.

Based on this, both the second time point and the third time point that are obtained in step S202 are recorded based on $FTM_{N-1}$, and the slave clock apparatus adjusts the clock count value based on the first clock count offset, and can obtain the adjusted clock count value. Therefore, the slave clock apparatus records, based on $$FTM'_{N-1},$$

the adjusted fifth time point at which the slave clock apparatus receives the second information from the master clock apparatus. The second information is a next piece of information adjacent to the first information. Then, the slave clock apparatus generates the second feedback information based on the second information, sends the second feedback information to the master clock apparatus, and then records, based on $$FTM'_{N-1},$$

the adjusted sixth time point at which the slave clock apparatus sends the second feedback information. In addition, based on a manner similar to that described in step S201, the slave clock apparatus can also obtain, through measurement, the seventh time point at which the master clock apparatus sends the second information and the eighth time point at which the master clock apparatus receives the second feedback information from the slave clock apparatus.

Figure 4:
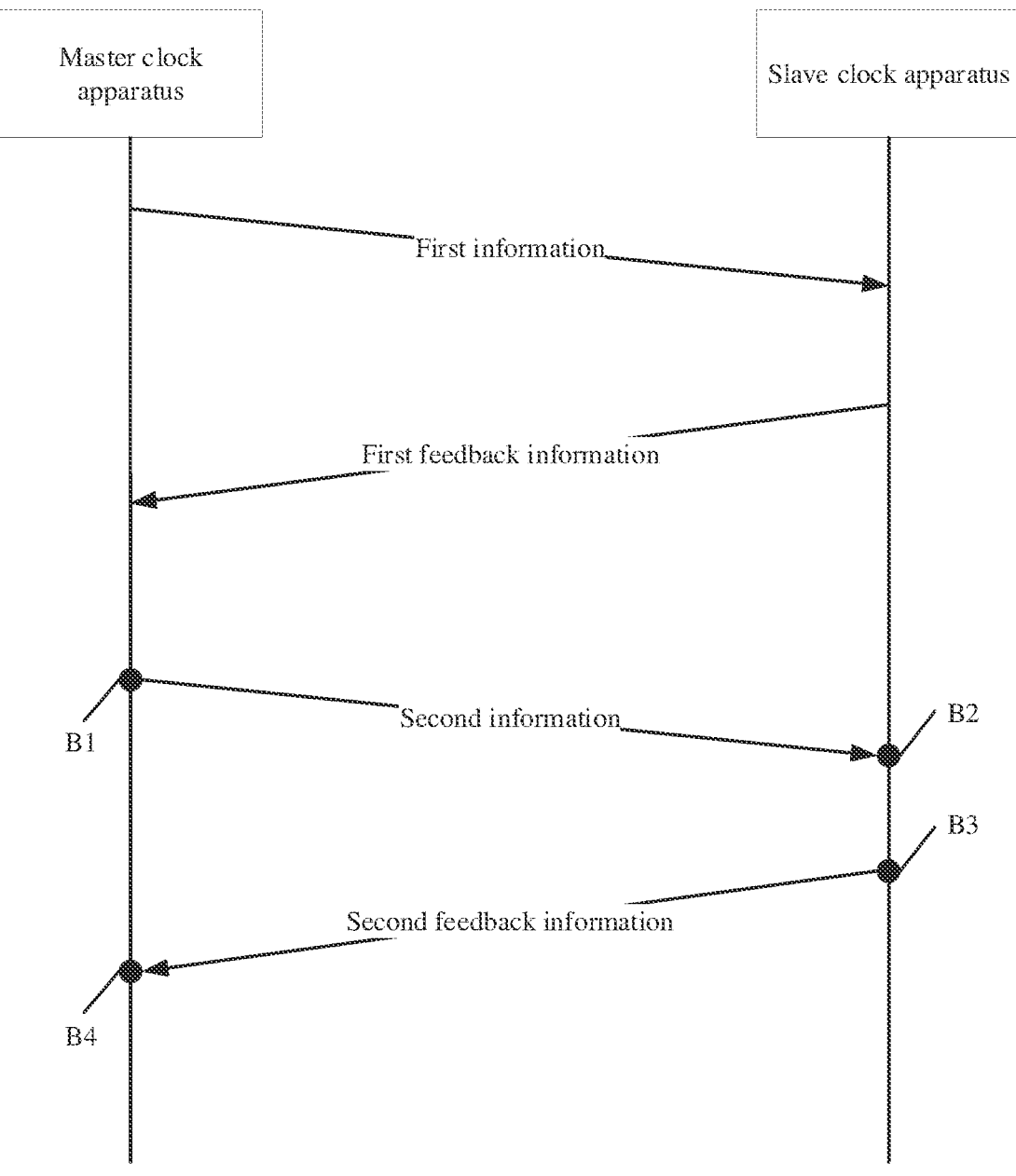
FIG. 4 is a schematic diagram of an embodiment of a time point and adjacent information according to an embodiment of the present disclosure.

For ease of understanding, further description is provided based on the example in FIG. 3. FIG. 4 is a schematic diagram of an embodiment of a time point and adjacent information according to an embodiment of the present disclosure. As shown in FIG. 4, after sending the first information to the slave clock apparatus, the master clock apparatus continues to send the second information adjacent to the first information to the slave clock apparatus. In this case, the slave clock apparatus adjusts the clock count value based on the first clock count offset. Based on this, B1 indicates the seventh time point at which the master clock apparatus sends the second information, B2 indicates the adjusted fifth time point at which the clock apparatus receives the second information from the master clock apparatus, B3 indicates the adjusted sixth time point at which the slave clock apparatus sends the second feedback information, and B4 indicates the eighth time point at which the master clock apparatus receives the second feedback information from the slave clock apparatus. It should be understood that the example in FIG. 4 is merely used to understand this solution, and a specific time point needs to be flexibly determined based on an actual situation.

Step 204: The slave clock apparatus obtains a second clock count offset based on the adjusted fifth time point, the adjusted sixth time point, the seventh time point, and the eighth time point.

In this embodiment, the slave clock apparatus obtains the second clock count offset through calculation based on the adjusted fifth time point, the adjusted sixth time point, the seventh time point, and the eighth time point that are obtained in step S203. The second clock count offset is used to indicate a difference between a clock count value of the slave clock apparatus and a clock count value of the master clock apparatus when the second information is sent and the second feedback information is received this time. Specifically, the slave clock apparatus calculates a time interval between the adjusted fifth time point and the seventh time point, then calculates a time interval between the adjusted sixth time point and the eighth time point, and obtains the second clock count offset by taking half of a difference between the two time intervals. The second clock count offset is used to adjust a time point at which the slave clock apparatus receives a next piece of information adjacent to the second information, and adjust a time point at which the slave clock apparatus sends a next piece of feedback information adjacent to the second feedback information.

For ease of understanding, the following describes, by using Formula (3), how to obtain the second clock count offset:

$$\text{clk\_offset}_N = \frac{(T_{2\_N} - T_{1\_N}) - (T_{4\_N} - T_{3\_N})}{2} \tag{3}$$

where $\text{clk\_offset}_N$ is the second clock count offset, $T_{1\_N}$ is the seventh time point, $T_{2\_N}$ is the adjusted fifth time point, $T_{3\_N}$ is the adjusted sixth time point, $T_{4\_N}$ is the eighth time point, and $N \geq 2$.

Step S205: The slave clock apparatus obtains a synchronization cycle.

In this embodiment, the slave clock apparatus obtains the synchronization cycle, and the synchronization cycle is used to adjust a clock count step of the slave clock apparatus. Specifically, the slave clock apparatus can obtain the synchronization cycle based on a time interval between the time point at which the master clock apparatus sends the second information and the time point at which the master clock apparatus sends the first information; or obtains the synchronization cycle based on a time interval between the time point at which the master clock apparatus receives the second feedback information and the time point at which the master clock apparatus receives the first feedback information; or obtains the synchronization cycle based on a time interval between the time point at which the master clock apparatus sends the second information and the time point at which the master clock apparatus sends the first information and a time interval between the time point at which the master clock apparatus receives the second feedback information and the time point at which the master clock apparatus receives the first feedback information.

For ease of understanding, when the slave clock apparatus can obtain the synchronization cycle based on the time interval between the time point at which the master clock apparatus sends the second information and the time point at which the master clock apparatus sends the first information, how to obtain the synchronization cycle is described by using Formula (4):

$$T_{N-1} = T_{1\_N} - T_{1\_N-1} \tag{4}$$

where $T_{N-1}$ is the synchronization cycle, $T_{1\_N}$ is the time point at which the master clock apparatus sends the second information, $T_{1\_N-1}$ is the time point at which the master clock apparatus sends the first information, and $N \geq 2$.

Figure 5:
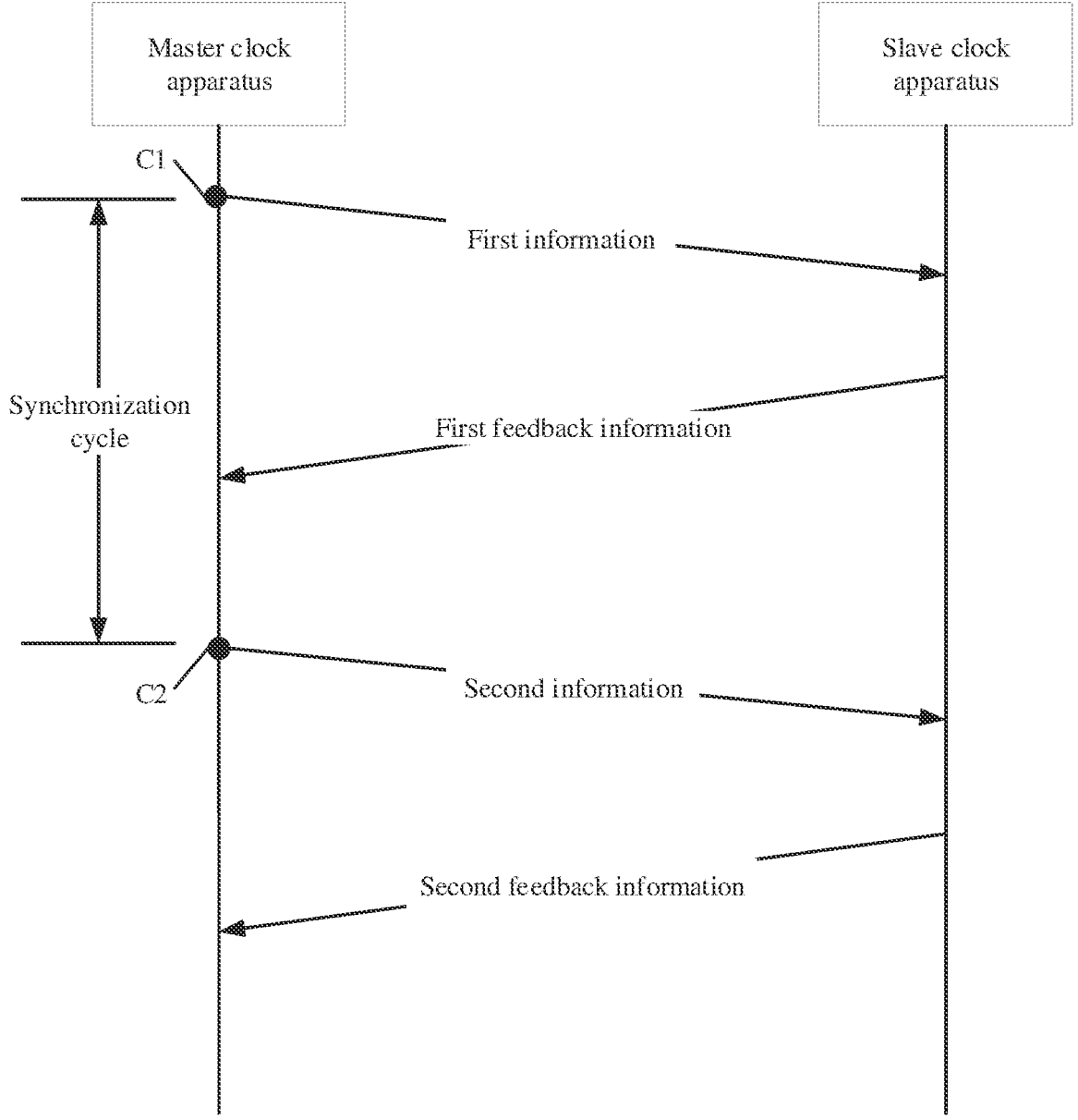
FIG. 5 is a schematic diagram of an embodiment of a synchronization cycle according to an embodiment of the present disclosure.

To help further understand this solution, further description is provided based on the examples in FIG. 3 and FIG. 4. FIG. 5 is a schematic diagram of an embodiment of a synchronization cycle according to an embodiment of the present disclosure. As shown in FIG. 5, C1 indicates the first time point at which the master clock apparatus sends the first information, and C2 indicates the seventh time point at which the master clock apparatus sends the second information. In this case, a time interval between the first time point C1 and the seventh time point C2 may be obtained as the synchronization cycle by using Formula (4).

In addition, when the slave clock apparatus can obtain the synchronization cycle based on the time interval between the time point at which the master clock apparatus receives the second feedback information and the time point at which the master clock apparatus receives the first feedback information, how to obtain the synchronization cycle is described by using Formula (5):

$$T_{N-1} = T_{4\_N} - T_{4\_N-1} \tag{5}$$

where $T_{N-1}$ is the synchronization cycle, $T_{4\_N}$ is the time point at which the master clock apparatus receives the second feedback information, $T_{4\_N-1}$ is the time point at which the master clock apparatus receives the first feedback information, and N≥2.

Figure 6:
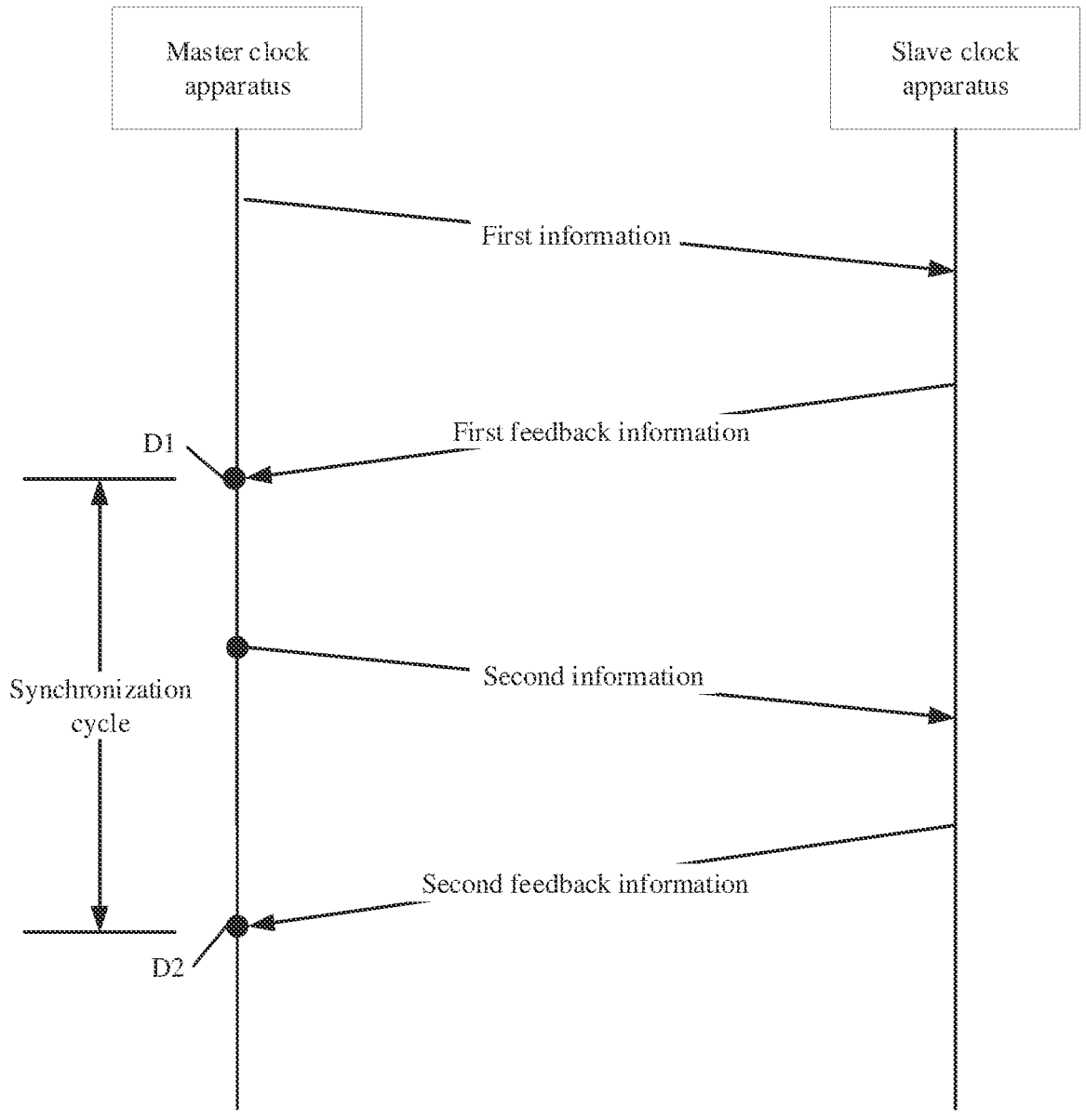
FIG. 6 is a schematic diagram of another embodiment of a synchronization cycle according to an embodiment of the present disclosure.

To help further understand this solution, further description is provided based on the examples in FIG. 3 and FIG. 4. FIG. 6 is a schematic diagram of another embodiment of a synchronization cycle according to an embodiment of the present disclosure. As shown in FIG. 6, D1 indicates the fourth time point at which the master clock apparatus receives the first feedback information, and D2 indicates the eighth time point at which the master clock apparatus receives the second feedback information. In this case, a time interval between the fourth time point D1 and the eighth time point may be obtained as the synchronization cycle by using Formula (5).

Furthermore, when the slave clock apparatus can obtain the synchronization cycle based on the time interval between the time point at which the master clock apparatus sends the second information and the time point at which the master clock apparatus sends the first information and the time interval between the time point at which the master clock apparatus receives the second feedback information and the time point at which the master clock apparatus receives the first feedback information, how to obtain the synchronization cycle is described by using Formula (6):

$$T_{N-1} = \frac{(T_{1\_N} - T_{1\_N-1}) + (T_{4\_N} - T_{4\_N-1})}{2} \tag{6}$$

where $T_{N-1}$ is the synchronization cycle, $T_{1\_N}$ is the time point at which the master clock apparatus sends the second information, $T_{1\_N-1}$ is the time point at which the master clock apparatus sends the first information, $T_{4\_N}$ is the time point at which the master clock apparatus receives the second feedback information, $T_{4\_N-1}$ is the time point at which the master clock apparatus receives the first feedback information, and N≥2.

Figure 7:
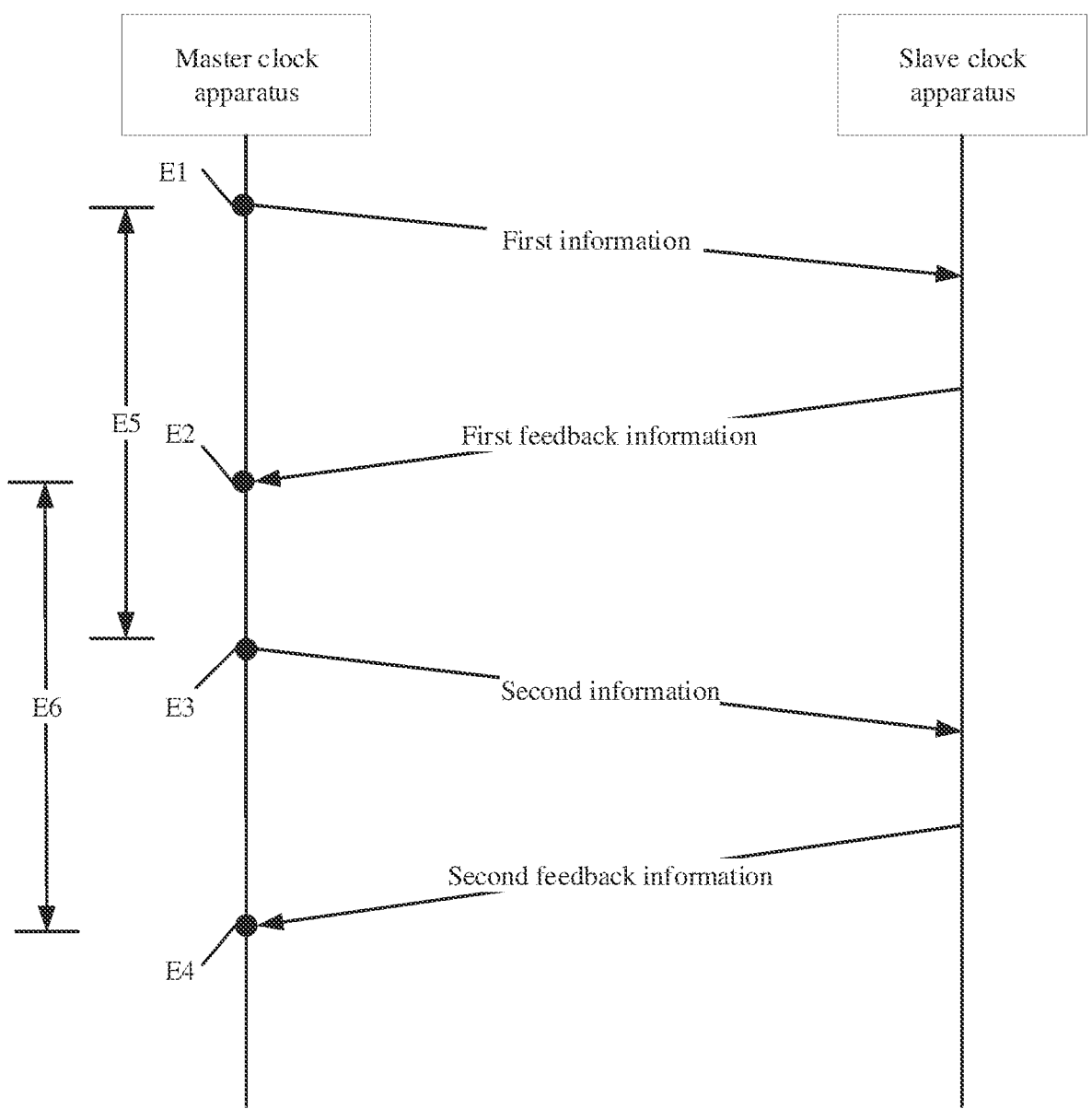
FIG. 7 is a schematic diagram of another embodiment of a synchronization cycle according to an embodiment of the present disclosure.

To help further understand this solution, further description is provided based on the examples in FIG. 3 and FIG. 4. FIG. 7 is a schematic diagram of another embodiment of a synchronization cycle according to an embodiment of the present disclosure. As shown in FIG. 7, E1 indicates the first time point at which the master clock apparatus sends the first information, E2 indicates the fourth time point at which the master clock apparatus receives the first feedback information, E3 indicates the seventh time point at which the master clock apparatus sends the second feedback information, and E4 indicates the eighth time point at which the master clock apparatus receives the second feedback information. In this case, a time interval E5 between the seventh time point E3 and the first time point E1 and a time interval E6 between the eighth time point E4 and the fourth time point E2 can be obtained, and then the synchronization cycle can be obtained by using Formula (6).

Step S206: The slave clock apparatus obtains a first clock frequency offset based on the first clock count offset and/or the second clock count offset.

In this embodiment, the slave clock apparatus obtains the first clock frequency offset based on a ratio of the first clock count offset and/or the second clock count offset to the synchronization cycle. The first clock frequency offset is a difference between a clock count frequency of the slave clock apparatus and a clock count frequency of the master clock apparatus. In this case, the clock count frequency of the slave clock apparatus is a clock count frequency existing when the slave clock receives the second information and sends the second feedback information, and the clock count frequency of the master clock apparatus is a clock count frequency existing when the master clock sends the second information and receives the second feedback information.

Specifically, the slave clock apparatus obtains the first clock frequency offset based on a ratio of the first clock count offset to the synchronization cycle. The following describes, by using Formula (7), a case in which the first clock frequency offset is obtained:

$$delta_{N-1} = \frac{clkoffset_{N-1}}{T} \tag{7}$$

where $delta_{N-1}$ is the first clock frequency offset, clkoffset$_{N-1}$ is the first clock count offset, T is the synchronization cycle, and N≥2.

Alternatively, the slave clock apparatus obtains the first clock frequency offset based on a ratio of the second clock count offset to the synchronization cycle. The following describes, by using Formula (8), another case in which the first clock frequency offset is obtained:

$$delta_{N-1} = \frac{clkoffset_N}{T} \tag{8}$$

where $delta_N$ is the first clock frequency offset, clkoffset$_N$ is the second clock count offset, T is the synchronization cycle, and N≥2.

Alternatively, the slave clock apparatus obtains the first clock frequency offset based on a ratio of a sum of the first clock count offset and the second clock count offset to the synchronization cycle. The following describes, by using Formula (9), still another case in which the first clock frequency offset is obtained:

$$delta_{N-1} = \frac{clkoffset_{N-1} + clkoffset_N}{T} \tag{9}$$

where $delta_N$ is the first clock frequency offset, clkoffset$_{N-1}$ is the first clock count offset, clkoffset$_N$ is the second clock count offset, T is the synchronization cycle, and N≥2.

Step S207: The slave clock apparatus adjusts a clock count step of the slave clock apparatus based on the first clock frequency offset.

In this embodiment, the slave clock apparatus can obtain the first clock frequency offset in the manner described in step S207. Therefore, the slave clock apparatus can adjust the clock count step of the slave clock apparatus based on the first clock frequency offset. The clock count step is a time length between adjacent clock count values.

Specifically, the following describes, by using Formula (10), a case in which the clock count step of the slave clock apparatus is adjusted:

$$FTM\_step_N = FTM\_step_{N-1}*(1-delta_{N-1}) \qquad (10)$$

where $delta_N$ is the first clock frequency offset, $FTM\_step_{N-1}$ is a clock count step (namely, a clock count step obtained through a previous time of adjustment) that is of the slave clock apparatus and that exists before adjustment, $FTM\_step_N$ is an adjusted clock count step of the slave clock apparatus, and $N \geq 2$. It should be understood that, when N is equal to 2, $FTM\_step_1$ is a preset step. The preset step is a time length that is of the slave clock apparatus and the master clock apparatus and that is determined through experiment and/or statistic collection performed based on a large amount of data. The preset step is not specifically limited herein.

Figure 8A:
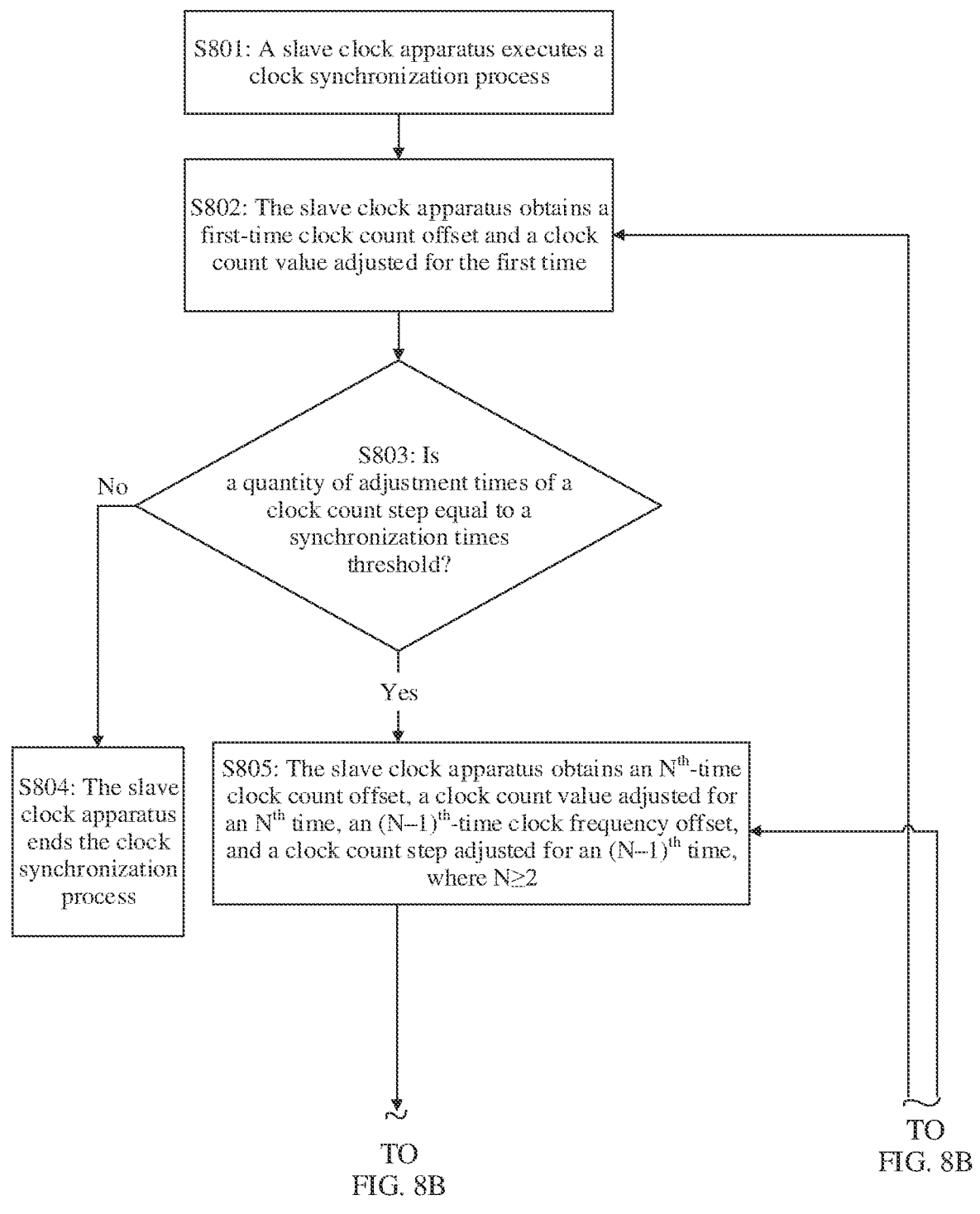
FIG. 8A and FIG. 8B are a schematic flowchart of determining a target clock count step according to an embodiment of the present disclosure.
Figure 8B:
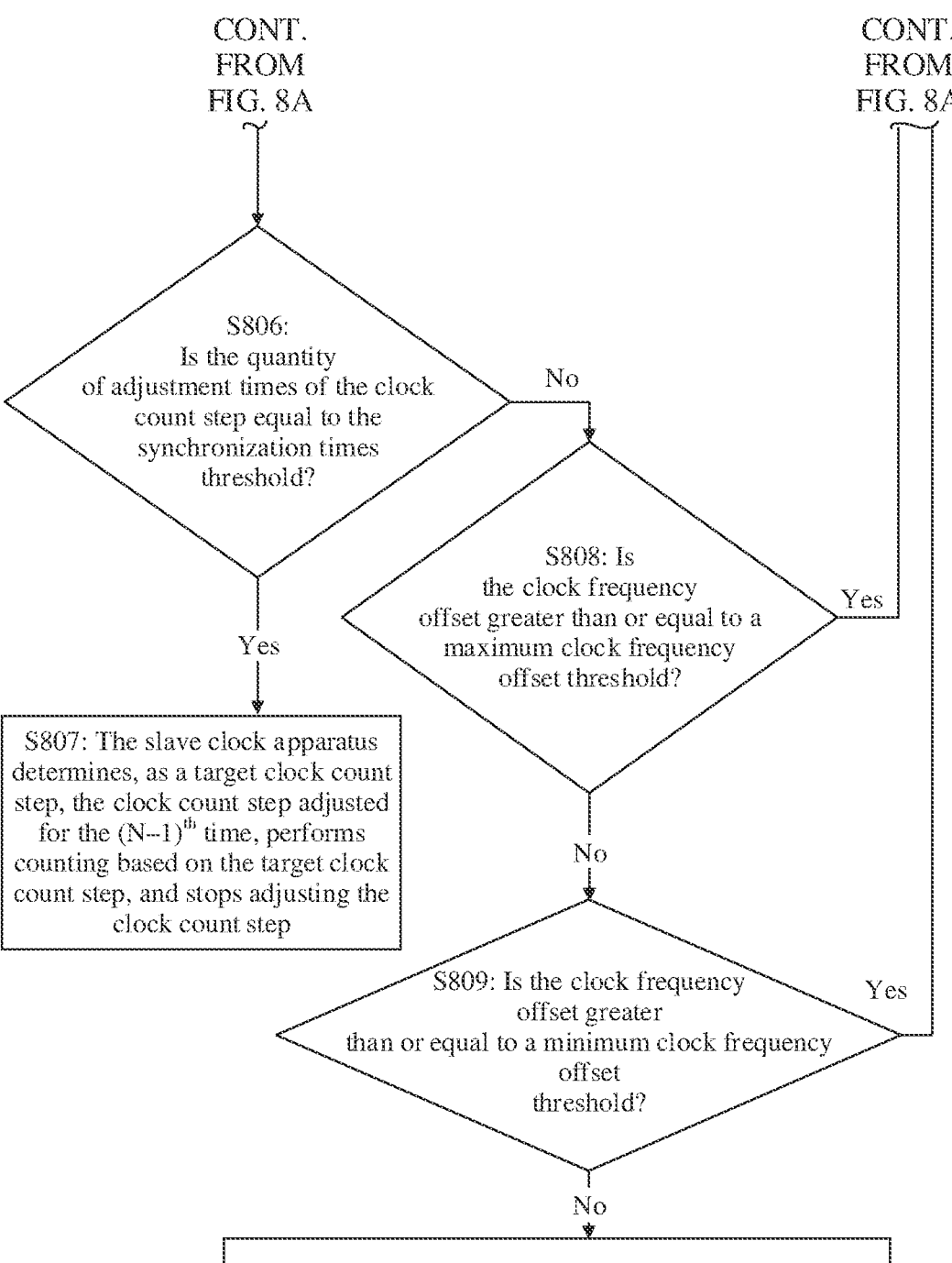

Further, the slave clock apparatus does not continuously adjust the clock count step, and when a specific condition is met, stops adjusting the clock count step, and performs counting by using a determined target clock count step. FIG. 8A and FIG. 8B are a schematic flowchart of determining a target clock count step according to an embodiment of the present disclosure. As shown in FIG. 8A and FIG. 8B, the following steps are included.

Step S801: A slave clock apparatus executes a clock synchronization process.

In this embodiment, the slave clock apparatus needs to first configure a register to calibrate a clock count step, and after the clock count step is calibrated, reconfigure the register, initialize measurement of a quantity of times that a master clock apparatus sends/receives information and feedback information, and then starts to execute the clock synchronization process.

Step S802: The slave clock apparatus obtains a first-time clock count offset and a clock count value adjusted for the first time.

In this embodiment, the slave clock apparatus obtains, in a manner similar to those described in step S202 and step S203 in FIG. 2, the first-time clock count offset and the clock count value adjusted for the first time. Details are not described herein again.

Step S803: The slave clock apparatus determines whether a quantity of adjustment times of the clock count step is equal to a synchronization times threshold.

In this embodiment, the slave clock apparatus determines whether the quantity of adjustment times of the clock count step is equal to the synchronization times threshold. If the quantity of adjustment times of the clock count step is equal to the synchronization times threshold, step S804 is performed. In this case, the synchronization times threshold is set to 0, and the clock count step is not adjusted yet. Therefore, the quantity of adjustment times of the clock count step is 0, that is, the quantity of adjustment times of the clock count step is equal to the synchronization times threshold. If the quantity of adjustment times of the clock count step is not equal to the synchronization times threshold, step S805 is performed. In this case, the synchronization times threshold is greater than 0. It should be understood that the synchronization times threshold is determined through experiment and/or statistic collection performed based on a large amount of data. The synchronization times threshold is not specifically limited herein.

Step S804: The slave clock apparatus ends the clock synchronization process.

In this embodiment, because the quantity of adjustment times is equal to the synchronization times threshold, although the slave clock apparatus does not adjust the clock count step, the clock synchronization process ends.

Step S805: The slave clock apparatus obtains an $N^{th}$-time clock count offset, a clock count value adjusted for an $N^{th}$ time, an $(N-1)^{th}$-time clock frequency offset, and a clock count step adjusted for an $(N-1)^{th}$ time, where $N \geq 2$.

In this embodiment, the slave clock apparatus obtains, in a manner similar to those described in step S203 to step S207 in FIG. 2, the $N^{th}$-time clock count offset, the clock count value adjusted for the $N^{th}$ time, the $(N-1)^{th}$-time clock frequency offset, and the clock count step adjusted for the $(N-1)^{th}$ time, and N is greater than or equal to 2. Details are not described herein again.

Step S806: The slave clock apparatus determines again whether the quantity of adjustment times of the clock count step is equal to the synchronization times threshold.

In this embodiment, the slave clock apparatus determines again whether the quantity of adjustment times of the clock count step is equal to the synchronization times threshold. If the quantity of adjustment times of the clock count step is equal to the synchronization times threshold, step S807 is performed. If the quantity of adjustment times of the clock count step is not equal to the synchronization times threshold, step S808 is performed.

Step S807: The slave clock apparatus determines, as a target clock count step, the clock count step adjusted for the $(N-1)^{th}$ time, performs counting based on the target clock count step, and stops adjusting the clock count step.

In this embodiment, after the clock count step adjusted for the $(N-1)^{th}$ time is obtained, the quantity of adjustment times of the clock count step is equal to the synchronization times threshold, that is, the synchronization times threshold is $(N-1)$. In this case, further adjustment of the clock count step is stopped. In addition, the clock count step adjusted for the $(N-1)^{th}$ time is determined as the target clock count step, and counting is performed based on the target clock count step during subsequent clock counting.

Step S808: The slave clock apparatus determines whether the clock frequency offset is greater than or equal to a maximum clock frequency offset threshold.

In this embodiment, the slave clock apparatus determines whether the clock frequency offset is greater than or equal to the maximum clock frequency offset threshold. If the clock frequency offset is greater than or equal to the maximum clock frequency offset threshold, it indicates that the clock frequency offset is excessively large. Therefore, step S802 is performed to restart a new clock synchronization process. If the clock frequency offset is not greater than or equal to the maximum clock frequency offset threshold, step S809 is performed. It should be understood that the maximum clock frequency offset threshold is a clock frequency offset that is between the slave clock apparatus and the master clock apparatus and that is determined through experiment and/or statistic collection performed based on a large amount of data. The maximum clock frequency offset threshold is not specifically limited herein.

Step S809: The slave clock apparatus determines whether the clock frequency offset is greater than or equal to a minimum clock frequency offset threshold.

In this embodiment, the slave clock apparatus further determines whether the clock frequency offset is greater than or equal to the minimum clock frequency offset threshold. If the clock frequency offset is greater than or equal to the minimum clock frequency offset threshold, it indicates that the clock frequency offset does not reach an acceptable offset range of clock synchronization, and adjustment needs to be performed again. Therefore, step S805 is performed. If the clock frequency offset is not greater than or equal to the minimum clock frequency offset threshold, it indicates that the clock frequency offset has reached an acceptable offset range of clock synchronization. Therefore, step S810 can be performed. It should be understood that the minimum clock frequency offset threshold is a clock frequency offset that is between the slave clock apparatus and the master clock apparatus and that is determined through experiment and/or statistic collection performed based on a large amount of data. The minimum clock frequency offset threshold is not specifically limited herein.

Step S810: The slave clock apparatus determines, as a target clock count step, a clock count step whose clock frequency offset is less than the minimum clock frequency offset threshold, performs counting based on the target clock count step, and stops adjusting the clock count step.

In this embodiment, after the clock count step adjusted for the $(N-1)^{th}$ time is obtained, it can be learned that a clock frequency offset of the clock count step is less than the minimum clock frequency offset threshold, that is, the clock frequency offset is an offset acceptable to the slave clock apparatus. In this case, the slave clock apparatus stops continuing to adjust the clock count step, determines, as the target clock count step, the clock count step adjusted for the $(N-1)^{th}$ time, and performs counting based on the target clock count step during subsequent clock counting.

It can be learned from the embodiments shown in FIG. 2 and FIG. 8A and FIG. 8B that a specific value of the synchronization cycle may be determined in three different manners, and the first clock frequency offset may also be determined in three different manners. To help further understand this solution, the following separately describes a plurality of manners.

(1) The slave clock apparatus obtains the synchronization cycle based on the time interval between the time point at which the master clock apparatus sends the second information and the time point at which the master clock apparatus sends the first information. In addition, the slave clock apparatus obtains the first clock frequency offset based on the ratio of the first clock count offset to the synchronization cycle.

An example in which an offset between the master clock apparatus and the slave clock apparatus is 50 parts per million (ppm) and a working clock of PHY is 160 MHz is used for description. T1, T2, T3, and T4 respectively indicate a time point at which the master clock apparatus sends information, a time point at which the slave clock apparatus receives the information, a time point at which the slave clock apparatus sends feedback information, and a time point at which the master clock apparatus receives the feedback information, and in the 160 MHz clock of PHY, each time length between adjacent clock count values is $FTM\_step_0$ (namely, a preset time step). FIG. 9 is a schematic diagram of another embodiment of a clock synchronization method according to an embodiment of the present disclosure. As shown in FIG. 9, specific steps of the clock synchronization method are as follows:

Step S901: A slave clock apparatus obtains a first-time clock count offset and a clock count value adjusted for the first time.

In this embodiment, the slave clock apparatus obtains, in a manner similar to those described in step S202 and step S203 in FIG. 2, the first-time clock count offset and the clock count value adjusted for the first time.

For example, the slave clock apparatus can record a time point at which the 1st information sent by a master clock apparatus is received, generate the 1st feedback information based on the 1st information, and send the 1st feedback information to the master clock apparatus. In this case, the slave clock apparatus can further record a time point at which the 1st feedback information is sent. Then, the slave clock apparatus obtains, through measurement, a time point at which the master clock apparatus sends the 1st information and a time point at which the master clock apparatus receives the 1st feedback information.

Therefore, the following may be obtained based on the foregoing Formula (1):

$$clk\_offset_1 = \frac{(T_{2\_1} - T_{1\_1}) - (T_{4\_1} - T_{3\_1})}{2}$$

where $clk\_offset_1$ is the first-time clock count offset, $T_{1\_1}$ is the time point at which the master clock apparatus sends the 1st information, $T_{2\_1}$ is the time point at which the master clock apparatus sends the 1st information, $T_{3\_1}$ is the time point at which the slave clock apparatus sends the 1st feedback information, and $T_{4\_1}$ is the time point at which the master clock apparatus receives the 1st feedback information.

Further, the following may be obtained based on the foregoing Formula (2):

$$FTM_1' = FTM_1 - clk\_offset_1$$

where $clk\_offset_1$ is the first-time clock count offset, $FTM_1$ is an unadjusted clock count value, and $$FTM_1'$$

is a clock count value adjusted for the first time.

Step S902: The slave clock apparatus obtains a clock count offset obtained through the second time of synchronization.

In this embodiment, the slave clock apparatus obtains, in a manner similar to those described in step S203 and step S204 in FIG. 2, the clock count offset obtained through the second time of synchronization.

For example, the slave clock apparatus can record a time point at which the 2nd information sent by the master clock apparatus is received, generate the 2nd feedback information based on the 2nd information, and send the 2nd feedback information to the master clock apparatus. In this case, the slave clock apparatus can further record a time point at which the 2nd feedback information is sent. Then, the slave clock apparatus obtains, through measurement, a time point at which the master clock apparatus sends the 2nd information and a time point at which the master clock apparatus receives the 2nd feedback information.

Therefore, the following may be obtained based on the foregoing Formula (3):

$$clk\_offset_2 = \frac{(T_{2\_2} - T_{1\_2}) - (T_{4\_2} - T_{3\_2})}{2}$$

where $\text{clk\_offset}_2$ is the clock count offset obtained through the second time of synchronization, $T_{1\_2}$ is the time point at which the master clock apparatus sends the 2nd information, $T_{2\_2}$ is the time point at which the master clock apparatus sends the 2nd information, $T_{3\_2}$ is the time point at which the slave clock apparatus sends the 2nd feedback information, and $T_{4\_2}$ is the time point at which the master clock apparatus receives the 2nd feedback information.

Step S903: The slave clock apparatus obtains the first synchronization cycle based on a time interval between the time point at which the master clock apparatus sends the 2nd information and the time point at which the master clock apparatus sends the 1st information.

In this embodiment, in a manner similar to that described in step S205 in FIG. 2, the slave clock apparatus obtains the first synchronization cycle based on the time interval between the time point at which the master clock apparatus sends the 2nd information and the time point at which the master clock apparatus sends the 1st information.

For example, based on the descriptions in the example in step S901 and step S902, the following may be obtained based on Formula (4):

$$T_1 = T_{1\_2} - T_{1\_1}$$

where $T_1$ is the first synchronization cycle, $T_{1\_2}$ is the time point at which the master clock apparatus sends the 2nd information, and $T_{1\_1}$ is the time point at which the master clock apparatus sends the 1st information.

Step S904: The slave clock apparatus obtains the 1st clock frequency offset based on a ratio of the first-time clock count offset to the first synchronization cycle.

In this embodiment, in a manner similar to that described in step S206 in FIG. 2, the slave clock apparatus obtains the 1st clock frequency offset based on the ratio of the first-time clock count offset to the first synchronization cycle obtained in step S903.

For example, based on the descriptions in the example in step S901 to step S903, the following may be obtained based on Formula (7):

$$\text{delta}_1 = \frac{\text{clkoffset}_1}{T}$$

where $\text{delta}_1$ is the 1st clock frequency offset, $\text{clkoffset}_1$ is the first-time clock count offset, and T is the first synchronization cycle.

Step S905: The slave clock apparatus adjusts a preset clock count step of the slave clock apparatus based on the 1st clock frequency offset.

In this embodiment, in a manner similar to that described in step S207 in FIG. 2, the slave clock apparatus adjusts the preset clock count step of the slave clock apparatus based on the 1st clock frequency offset, to obtain the first adjusted clock count step.

For example, based on the descriptions in the example in step S901 to step S904, the following may be obtained based on Formula (10):

$$\text{FTM\_step}_1 = \text{FTM\_step}_0 * (1 - \text{delta}_1) \tag{10}$$

where $\text{delta}_1$ is the 1st clock frequency offset, $\text{FTM\_step}_0$ is the preset clock count step, and $\text{FTM\_step}_1$ is the first adjusted clock count step.

Step S906: The slave clock apparatus obtains a clock count offset obtained through an $N^{th}$ time of synchronization, where N is greater than 2.

In this embodiment, a manner in which the slave clock apparatus obtains the clock count offset obtained through the $N^{th}$ time of synchronization is similar to the manners described in step S203, step S204, and step S902. Details are not described herein again. N is greater than 2.

Step S907: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2.

In this embodiment, a manner in which the slave clock apparatus obtains the $N^{th}$ synchronization cycle based on the time interval between the time point at which the master clock apparatus sends the $N^{th}$ information and the time point at which the master clock apparatus sends the $N^{th}$ information is similar to the manners described in step S205 and step S903. Details are not described herein again. N is greater than 2.

Step S908: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle.

In this embodiment, a manner in which the slave clock apparatus obtains the $(N-1)^{th}$ clock frequency offset based on the ratio of the clock count offset obtained through the $(N-1)^{th}$ time of synchronization to the $(N-1)^{th}$ synchronization cycle is similar to the manners described in step S206 and step S904. Details are not described herein again. N is greater than 2.

Step S909: The slave clock apparatus adjusts an $(N-2)^{th}$ adjusted clock count step of the slave clock apparatus based on the $(N-1)^{th}$ clock frequency offset.

In this embodiment, a manner in which the slave clock apparatus adjusts the $(N-2)^{th}$ adjusted clock count step of the slave clock apparatus based on the $(N-1)^{th}$ clock frequency offset is similar to the manners described in step S207 and step S905. Details are not described herein again. N is greater than 2.

Step S910: The slave clock apparatus determines a target clock count step, performs counting based on the target clock count step, and stops adjusting the clock count step.

In this embodiment, a manner in which the slave clock apparatus determines the target clock count step, performs counting based on the target clock count step, and stops adjusting the clock count step is similar to the manners described in step S807 and step S809. Details are not described herein again.

Figure 10:
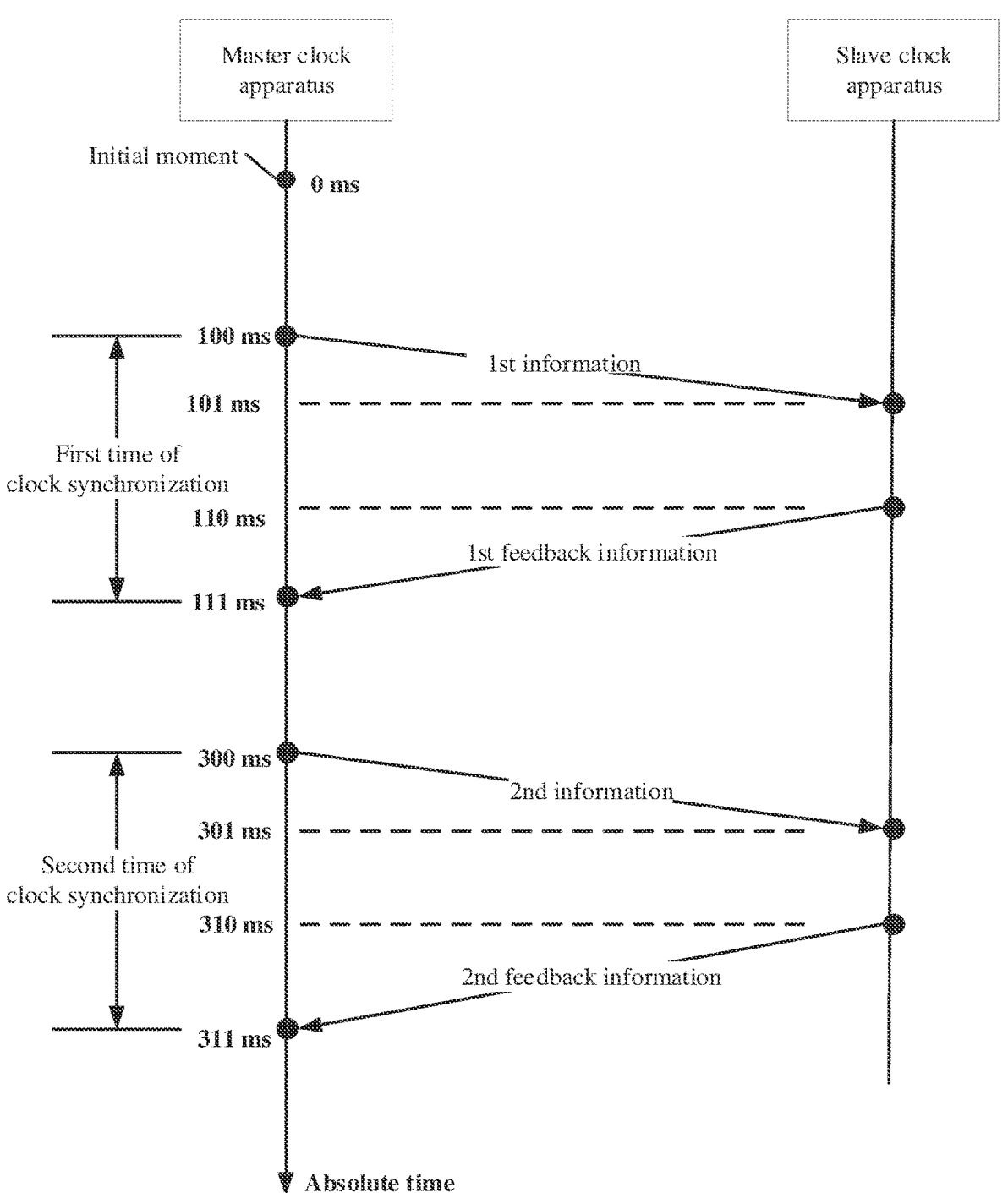
FIG. 10 is a schematic interaction diagram of sending/receiving information and feedback information according to an embodiment of the present disclosure.

To help further understand the clock synchronization method in the case shown in FIG. 9 and improve effect of clock synchronization accuracy, in the following, it is assumed that an actual crystal oscillator frequency (namely, a clock count frequency of the master clock apparatus) of the master clock apparatus is 160 megahertz (MHz), and an actual crystal oscillator frequency (namely, a clock count frequency of the slave clock apparatus) of the slave clock apparatus is 160*(1−20e−6)−159.9968 MHz, and at an initial moment before clock synchronization is performed, an internal counter time (clock count value of the master clock apparatus) of the master clock apparatus is AP_FTM= (0:100:0:0:0:0), an internal counter time (clock count value of the slave clock apparatus) of the slave clock apparatus is STA_FTM=(0:500:0:0:0:0), and a time unit is (sms:us:ns: ps:($2^{\wedge}-16$ ps)). Based on this, after clock synchronization is performed, the master clock apparatus updates the internal counter time based on AP_STEP=(0:0:0:6:250:0), and the slave clock apparatus updates the internal counter time based on a count step of STA_STEP=(0:0:0:6:250:0). Based on the foregoing assumption, FIG. 10 is a schematic inter-action diagram of sending/receiving information and feed-back information according to an embodiment of the present disclosure. FIG. 10 shows specific sending/receiving infor-mation and feedback information between the master clock apparatus and the slave clock apparatus.

In the first time of clock synchronization process, it is assumed that during the first time of clock synchronization measurement, the master clock apparatus sends the 1st information at an absolute moment 100 ms, and records a counter time $T_{1\_1}$ at which the master clock apparatus sends the 1st information; the slave clock apparatus receives the 1st information at 101 ms, and records a counter time $T_{2\_1}$ at which the slave clock apparatus receives the 1st informa-tion; the slave clock apparatus sends, to the master clock apparatus at 110 ms, the 1st feedback information generated based on the 1st information, and records a counter time $T_{3\_1}$ at which the slave clock apparatus sends the 1st feedback information; and the master clock apparatus receives the 1st feedback information at 111 ms, and records a counter time $T_{4\_1}$ at which the master clock apparatus receives the 1st feedback information.

Based on this, the following first describes how to obtain $T_{1\_1}$ and $T_{4\_1}$. In a time period of 100 ms between the initial moment before clock synchronization is performed and $T_{1\_1}$, a quantity of cycles completed by a crystal oscillator of the master clock apparatus is as follows:

> 100 ms*160 MHz=1.6*10e.

Therefore, it can be learned that, the counter of the master clock apparatus is increased by AP_STEP=(0:0:0:6:250:0) in each cycle. Therefore, at $T_{1\_1}$, a clock count value of the master clock apparatus is as follows:

> AP_FTM=(0:100:0:0:0:0)+(0:0:0:6:250:0)*1.6*10e7=
> (0:200:0:0:0:0).

It can be learned that $T_{1\_1}$=AP_FTM=(0:200:0:0:0:0).

In addition, in a time period of 11 ms between $T_{1\_1}$ and $T_{4\_1}$, a quantity of cycles-completed by the crystal oscillator of the master clock apparatus is as follows:

> 11 ms*160 MHz=1760000.

Therefore, it can be learned that, the counter of the master clock apparatus is increased by AP_STEP=(0:0:0:6:250:0) in each cycle. Therefore, at $T_{4\_1}$, the clock count value of the master clock apparatus is as follows:

> AP_FTM=(0:200:0:0:0:0)+(0:0:0:6:250:0)*1760000=
> (0:211:0:0:0:0).

It can be learned that $T_{4\_1}$=AP_FTM=(0:211:0:0:0:0).

Further, the following describes how to obtain $T_{2\_1}$ and $T_{3\_1}$. In a time period of 101 ms between the initial moment before clock synchronization is performed and $T_{2\_1}$, a quantity of cycles completed by a crystal oscillator of the slave clock apparatus is as follows:

> ceil(101 ms*159.9968 MHz)=16159677.

Therefore, it can be learned that, the counter of the slave clock apparatus is increased by STA_STEP=(0:0:0:6:250:0) in each cycle. Therefore, at $T_{2\_1}$, a clock count value of the slave clock apparatus is as follows:

> STA_FTM=(0:500:0:0:0:0)+(0:0:0:6:
> 250:0)*16159677=(0:600:997:981:250:0).

It can be learned that $T_{2\_1}$-=STA_FTM=(0:600:997:981:250:0).

In addition, in a time period of 9 ms between $T_{2\_1}$ and $T_{3\_1}$, a quantity of cycles completed by the crystal oscillator of the slave clock apparatus is as follows:

> ceil(9 ms*159.9968 MHz)=1439972.

Therefore, it can be learned that, the counter of the slave clock apparatus is increased by STA_STEP=(0:0:0:6:250:0) in each cycle. Therefore, at $T_{3\_1}$, the clock count value of the slave clock apparatus is as follows:

> STA_FTM=(0:600:997:981:250:0)+(0:0:0:6:
> 250:0)*1439972=(0:609:997:806:250:0).

It can be learned that $T_{3\_1}$=STA_FTM=(0:609:997:806:250:0).

Based on the embodiment in FIG. 9, it can be learned that after the first time of clock synchronization, the slave clock apparatus can obtain the time points at which the master clock apparatus sends the 1st information and receives the 1st feedback information and the time points at which the slave clock apparatus receives the 1st information and sends the 1st feedback information, and calculate a clock count offset between the master clock apparatus and the slave clock apparatus based on the obtained $T_{1\_1}$, $T_{2\_1}$, $T_{3\_1}$, and $T_{4\_1}$.

Based on Formula 1, it can be learned that:

$$\text{clk\_offset}_1 = \frac{(T_{2\_1} - T_{1\_1}) - (T_{4\_1} - T_{3\_1})}{2} =$$

$$(0:400:997:981:250:0) - (-(0:398:997:806:250:0))/2 =$$

$$(0:399:997:893:750:0)$$

Therefore, it can be learned that, after clock synchroni-zation is completed for the first time, the clock count offset (which is actually updated at a moment later than $T_{4\_1}$) of the slave clock apparatus is updated at $T_{4\_1}$. At $T_{4\_1}$ (that is, at 111 ms), in 1 ms between $T_{3\_1}$ and $T_{4\_1}$, a quantity of cycles completed by the crystal oscillator of the slave clock apparatus is as follows:

> ceil(1 ms*159.9968 MHz)=159997.

In addition, the counter of the slave clock apparatus is increased by STA_STEP=(0:0:0:6:250:0) in each cycle. Therefore, at $T_{4\_1}$, the clock count value of the slave clock apparatus is as follows:

> STA_FTM=(0:609:997:806:250:0)+(0:0:0:6:
> 250:0)*159997=(0:610:997:787:500:0).

The clock count value of the slave clock apparatus is adjusted based on the obtained $\text{clk\_offset}_1$;

> STA_FTM=(0:610:997:787:500:0)-(0:399:997:893:
> 750:0)-(0:210:999:893:750:0).

The clock count value of the slave clock apparatus is adjusted by using the first-time clock count offset. It can be learned from the adjusted clock count value that an offset between the clock count value of the master clock apparatus and the clock count value of the slave clock apparatus is small.

The following description is provided: In the second time of clock synchronization process, it is assumed that during the first time of clock synchronization measurement, the master clock apparatus sends the 2nd information at an absolute moment 300 ms, and records a counter time $T_{1\_2}$ at which the master clock apparatus sends the 2nd information; the slave clock apparatus receives the 2nd information at 301 ms, and records a counter time $T_{2\_2}$ at which the slave clock apparatus receives the 2nd information; the slave clock apparatus sends, to the master clock apparatus at 310 ms, the 2nd feedback information generated based on the 2nd information, and records a counter time $T_{3\_2}$ at which the slave clock apparatus sends the 2nd feedback information; and the master clock apparatus receives the 2nd feedback information at 311 ms, and records a counter time $T_{4\_2}$ at which the master clock apparatus receives the 2nd feedback information.

Based on this, the following first describes how to obtain $T_{1\_2}$ and $T_{4\_2}$. In a time period of 189 ms between $T_{4\_1}$ obtained through the first time of measurement and the second-time $T_{1\_2}$, a quantity of cycles completed by a crystal oscillator of the master clock apparatus is as follows:

189 ms*160 MHz=3.024*10e7.

Therefore, it can be learned that, the counter of the master clock apparatus is increased by AP_STEP=(0:0:0:6:250:0) in each cycle. Therefore, at $T_{1\_2}$, a clock count value of the master clock apparatus is as follows:

AP_FTM=(0:211:0:0:0:0)+(0:0:0:6:250:0)
*3.024*10e7=(0:400:0:0:0:0).

It can be learned that $T_{1\_2}$=AP_FTM=(0:400:0:0:0:0).

In a time period of 11 ms between the second-time $T_{1\_2}$ and the second-time $T_{4\_2}$, a quantity of cycles completed by the crystal oscillator of the master clock apparatus is as follows:

11 ms*160 MHz=1760000.

Therefore, it can be learned that, the counter of the master clock apparatus is increased by AP_STEP=(0:0:0:6:250:0) in each cycle. Therefore, at $T_{4\_2}$, the clock count value of the master clock apparatus is as follows:

AP_FTM=(0:400:0:0:0:0)+(0:0:0:6:250:0)*1760000=
(0:411:0:0:0:0).

It can be learned that $T_{4\_2}$=AP_FTM=(0:411:0:0:0:0).

Further, the following describes how to obtain $T_{2\_2}$ and $T_{3\_2}$. In a time period of 190 ms between $T_{4\_1}$ obtained through the first time of measurement and the second-time $T_{2\_2}$, a quantity of cycles completed by a crystal oscillator of the slave clock apparatus is as follows:

ceil(190 ms*159.9968 MHz)=30399392.

Therefore, it can be learned that, the counter of the slave clock apparatus is increased by STA_STEP=(0:0:0:6:250:0) in each cycle. Therefore, at $T_{2\_2}$, a clock count value of the slave clock apparatus is as follows:

STA_FTM=(0:210:999:893:750:0)+(0:0:0:6:
250:0)*30399392=(0:400:996:093:750:0).

It can be learned that $T_{2\_2}$=STA_FTM=(0:400:996:093:750:0).

In a time period of 9 ms between the second-time $T_{2\_2}$ and $T_{3\_2}$, a quantity of cycles completed by the crystal oscillator of the slave clock apparatus is as follows:

ceil(9 ms*159.9968 MHz)=1439972.

Therefore, it can be learned that, the counter of the slave clock apparatus is increased by STA_STEP=(0:0:0:6:250:0) in each cycle. Therefore, at $T_{3\_2}$, the clock count value of the slave clock apparatus is as follows:

STA_FTM=(0:400:996:093:750:0)+(0:0:0:6:250:0)
*1439972=(0:409:995:918:750:0).

It can be learned that $T_{3\_2}$=STA_FTM=(0:409:995:918:750:0).

Based on the embodiment in FIG. 9, it can be learned that after the second time of clock synchronization, the slave clock apparatus can obtain the time points at which the master clock apparatus sends the 2nd information and receives the 2nd feedback information and the time points at which the slave clock apparatus receives the 2nd information and sends the 2nd feedback information, and calculate a clock count offset between the master clock apparatus and the slave clock apparatus based on the obtained $T_{1\_2}$, $T_{2\_2}$, $T_{3\_2}$, and $T_{4\_2}$.

Based on Formula 3, it can be learned that:

$$\text{clk\_offset}_2 = \frac{(T_{2\_2} - T_{1\_2}) - (T_{4\_2} - T_{3\_2})}{2} - (0:0:996:093:750:0) -$$
$$(0:1:4:81:250:0)/2 = -(0:0:3:993:750:0)$$

In this case, a time interval between the first time of measurement and the second time of measurement is determined as a synchronization cycle, that is, the synchronization cycle is obtained based on a time interval between the time point at which the master clock apparatus sends the 2nd information and the time point at which the master clock apparatus sends the 1st information. The following may be obtained based on Formula (4):

$$T_1 = T_{1\_2} - T_{1\_1} =$$
$$(0:400:0:0:0:0) - (0:200:0:0:0:0) = (0:200:0:0:0:0)$$

Then, a clock frequency offset (crystal oscillator offset) is determined based on the clock count offset obtained through the first time of measurement and the synchronization cycle, and the following may be obtained based on Formula (7):

$$\text{delta}_1 = \frac{clkoffset_1}{T} = -0.00001996875$$

After clock synchronization is completed for the second time, the clock count offset (which is actually updated at a moment later than $T_{4\_2}$) of the slave clock apparatus is updated at $T_{4\_2}$. At $T_{4\_2}$ (that is, at 311 ms), in 1 ms between $T_{3\_2}$ and $T_{4\_2}$, a quantity of cycles completed by the crystal oscillator of the slave clock apparatus is as follows:

ceil(1 ms*159.9968 MHz)=159997.

Therefore, it can be learned that, the counter of the slave clock apparatus is increased by STA_STEP=(0:0:0:6:250:0) in each cycle. Therefore, at $T_{4\_2}$, the clock count value of the slave clock apparatus is as follows:

STA_FTM=(0:409:995:918:750:0)+(0:0:0:6:250:0)
*159997=(0:410:995:900:0:0).

Then, the clock count value of the slave clock apparatus is adjusted based on clk_offset$_2$:

STA_FTM=(0:410:995:900:0:0)−(−(0:0:3:993:750:0))
=(0:410:999:893:750:0).

The clock count step of the slave clock apparatus is adjusted based on the clock frequency offset delta$_1$, and the following may be obtained based on Formula (10):

$$FTM\_step_1 = FTM\_step_0 * (1 - delta_1) =$$

$$(0:\ 0:\ 0:\ 6:\ 250:\ 0) * 1.00001996875 = (0:\ 0:\ 0:\ 6:\ 250:\ 8179).$$

In a plurality of subsequent clock synchronization processes, the foregoing manner may be used for measurement. It can be learned from the foregoing manner that, after the clock count value of the slave clock apparatus is adjusted, the offset between the clock count value of the master clock apparatus and the clock count value of the slave clock apparatus is small. In addition, after the clock count step of the slave clock apparatus is adjusted, the offset between the clock count step of the master clock apparatus and the clock count step of the slave clock apparatus is also reduced. It can be learned that clock synchronization accuracy can be improved by using the clock synchronization method provided in this embodiment.

(2) The slave clock apparatus obtains the synchronization cycle based on the time interval between the time point at which the master clock apparatus sends the second information and the time point at which the master clock apparatus sends the first information. In addition, the slave clock apparatus obtains the first clock frequency offset based on the ratio of the second clock count offset to the synchronization cycle.

An example in which an offset between the master clock apparatus and the slave clock apparatus is 50 ppm and a working clock of PHY is 160 MHz is used for description. T1, T2, T3, and T4 respectively indicate a time point at which the master clock apparatus sends information, a time point at which the slave clock apparatus receives the information, a time point at which the slave clock apparatus sends feedback information, and a time point at which the master clock apparatus receives the feedback information, and in the 160 MHz clock of PHY, each time length between adjacent clock count values is $FTM\_step_0$ (namely, a preset time step). FIG. 11 is a schematic diagram of another embodiment of a clock synchronization method according to an embodiment of the present disclosure. As shown in FIG. 11, specific steps of the clock synchronization method are as follows:

Step S1101: A slave clock apparatus obtains a first-time clock count offset and a clock count value adjusted for the first time.

Step S1102: The slave clock apparatus obtains a clock count offset obtained through the second time of synchronization.

Step S1103: The slave clock apparatus obtains the first synchronization cycle based on a time interval between the time point at which a master clock apparatus sends the 2nd information and the time point at which the master clock apparatus sends the 1st information.

In this embodiment, step S1101 to step S1103 are similar to step S901 to step S903, and details are not described herein again.

Step S1104: The slave clock apparatus obtains the 1st clock frequency offset based on a ratio of the clock count offset obtained through the second time of synchronization to the first synchronization cycle.

In this embodiment, in a manner similar to that described in step S206 in FIG. 2, the slave clock apparatus obtains the 1st clock frequency offset based on the ratio of the clock count offset obtained through the second time of synchronization to the first synchronization cycle obtained in step S1103.

For example, based on the descriptions in the example in step S1101 to step S1103, the following may be obtained based on Formula (8):

$$delta_1 = \frac{clkoffset_2}{T}$$

where $delta_1$ is the 1st clock frequency offset, $clkoffset_2$ is the clock count offset obtained through the second time of synchronization, and T is the first synchronization cycle.

Step S1105: The slave clock apparatus adjusts a preset clock count step of the slave clock apparatus based on the 1st clock frequency offset.

Step S1106: The slave clock apparatus obtains a clock count offset obtained through an $N^{th}$ time of synchronization, where N is greater than 2.

Step S1107: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2.

Step S1108: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle.

Step S1109: The slave clock apparatus adjusts an $(N-2)^{th}$ adjusted clock count step of the slave clock apparatus based on the $(N-1)^{th}$ clock frequency offset.

Step S1110: The slave clock apparatus determines a target clock count step, performs counting based on the target clock count step, and stops adjusting the clock count step.

In this embodiment, step S1105 to step S1110 are similar to step S905 to step S910, and details are not described herein again.

(3) The slave clock apparatus obtains the synchronization cycle based on the time interval between the time point at which the master clock apparatus sends the second information and the time point at which the master clock apparatus sends the first information. In addition, the slave clock apparatus obtains the first clock frequency offset based on the ratio of the sum of the first clock count offset and the second clock count offset to the synchronization cycle.

An example in which an offset between the master clock apparatus and the slave clock apparatus is 50 ppm and a working clock of PHY is 160 MHz is used for description. T1, T2, T3, and T4 respectively indicate a time point at which the master clock apparatus sends information, a time point at which the slave clock apparatus receives the information, a time point at which the slave clock apparatus sends feedback information, and a time point at which the master clock apparatus receives the feedback information, and in the 160 MHz clock of PHY, each time length between adjacent clock count values is $FTM\_step_0$ (namely, a preset time step). FIG. 12 is a schematic diagram of another embodiment of a clock synchronization method according to an embodiment of the present disclosure. As shown in FIG. 12, specific steps of the clock synchronization method are as follows:

Step S1201: A slave clock apparatus obtains a first-time clock count offset and a clock count value adjusted for the first time.

Step S1202: The slave clock apparatus obtains a clock count offset obtained through the second time of synchronization.

Step S1203: The slave clock apparatus obtains the first synchronization cycle based on a time interval between the time point at which a master clock apparatus sends the 2nd information and the time point at which the master clock apparatus sends the 1st information.

In this embodiment, step S1201 to step S1203 are similar to step S901 to step S903, and details are not described herein again.

Step S1204: The slave clock apparatus obtains the 1st clock frequency offset based on a ratio of a sum of the first-time clock count offset and the clock count offset obtained through the second time of synchronization to the first synchronization cycle.

In this embodiment, in a manner similar to that described in step S206 in FIG. 2, the slave clock apparatus obtains the 1st clock frequency offset based on the ratio of the first-time clock count offset and the clock count offset obtained through the second time of synchronization to the first synchronization cycle obtained in step S1203.

For example, based on the descriptions in the example in step S1201 to step S1203, the following may be obtained based on Formula (9):

$$delta_1 = \frac{clkoffset_1 + clkoffset_2}{T}$$

where $delta_1$ is the 1st clock frequency offset, $clkoffset_1$ is the first-time clock count offset, $clkoffset_2$ is the clock count offset obtained through the second time of synchronization, and T is the first synchronization cycle.

Step S1205: The slave clock apparatus adjusts a preset clock count step of the slave clock apparatus based on the 1st clock frequency offset.

Step S1206: The slave clock apparatus obtains a clock count offset obtained through an $N^{th}$ time of synchronization, where N is greater than 2.

Step S1207: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2.

Step S1208: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle.

Step S1209: The slave clock apparatus adjusts an $(N-2)^{th}$ adjusted clock count step of the slave clock apparatus based on the $(N-1)^{th}$ clock frequency offset.

Step S1210: The slave clock apparatus determines a target clock count step, performs counting based on the target clock count step, and stops adjusting the clock count step.

In this embodiment, step S1205 to step S1210 are similar to step S905 to step S910, and details are not described herein again.

(4) The slave clock apparatus obtains the synchronization cycle based on the time interval between the time point at which the master clock apparatus receives the second feedback information and the time point at which the master clock apparatus receives the first feedback information. In addition, the slave clock apparatus obtains the first clock frequency offset based on the ratio of the first clock count offset to the synchronization cycle.

An example in which an offset between the master clock apparatus and the slave clock apparatus is 50 ppm and a working clock of PHY is 160 MHz is used for description.

T1, T2, T3, and T4 respectively indicate a time point at which the master clock apparatus sends information, a time point at which the slave clock apparatus receives the information, a time point at which the slave clock apparatus sends feedback information, and a time point at which the master clock apparatus receives the feedback information, and in the 160 MHz clock of PHY, each time length between adjacent clock count values is $FTM\_step_0$ (namely, a preset time step). FIG. 13 is a schematic diagram of another embodiment of a clock synchronization method according to an embodiment of the present disclosure. As shown in FIG. 13, specific steps of the clock synchronization method are as follows:

Step S1301: A slave clock apparatus obtains a first-time clock count offset and a clock count value adjusted for the first time.

Step S1302: The slave clock apparatus obtains a clock count offset obtained through the second time of synchronization.

In this embodiment, step S1201 and step S1202 are similar to step S901 and step S902, and details are not described herein again.

Step S1303: The slave clock apparatus obtains the first synchronization cycle based on a time interval between a time point at which a master clock apparatus receives the 2nd feedback information and a time point at which the master clock apparatus receives the 1st feedback information.

In this embodiment, in a manner similar to that described in step S205 in FIG. 2, the slave clock apparatus obtains the first synchronization cycle based on the time interval between the time point at which the master clock apparatus receives the 2nd feedback information and the time point at which the master clock apparatus receives the 1st feedback information.

For example, based on the descriptions in the example in step S901 and step S902, the following may be obtained based on Formula (5):

$$T_1 = T_{4\_2} - T_{4\_1}$$

where $T_1$ is the first synchronization cycle, $T_{4\_2}$ is the time point at which the master clock apparatus receives the 2nd feedback information, and $T_{4\_1}$ is the time point at which the master clock apparatus receives the 1st feedback information.

Step S1304: The slave clock apparatus obtains the 1st clock frequency offset based on a ratio of the first-time clock count offset to the first synchronization cycle.

In this embodiment, in a manner similar to that described in step S206 in FIG. 2, the slave clock apparatus obtains the 1st clock frequency offset based on the ratio of the first-time clock count offset to the first synchronization cycle obtained in step S1303.

For example, based on the descriptions in the example in step S901 to step S903, the following may be obtained based on Formula (7):

$$delta_1 = \frac{clkoffset_1}{T}$$

where $delta_1$ is the 1st clock frequency offset, $clkoffset_1$ is the first-time clock count offset, and T is the first synchronization cycle.

Step S1305: The slave clock apparatus adjusts a preset clock count step of the slave clock apparatus based on the 1st clock frequency offset.

Step S1306: The slave clock apparatus obtains a clock count offset obtained through an $N^{th}$ time of synchronization, where N is greater than 2.

Step S1307: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2.

Step S1308: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle.

Step S1309: The slave clock apparatus adjusts an $(N-2)^{th}$ adjusted clock count step of the slave clock apparatus based on the $(N-1)^{th}$ clock frequency offset.

Step S1310: The slave clock apparatus determines a target clock count step, performs counting based on the target clock count step, and stops adjusting the clock count step.

In this embodiment, step S1305 to step S1310 are similar to step S905 to step S910, and details are not described herein again.

(5) The slave clock apparatus obtains the first synchronization cycle based on the time interval between the time point at which the master clock apparatus receives the second feedback information and the time point at which the master clock apparatus receives the first feedback information. In addition, the slave clock apparatus obtains the first clock frequency offset based on the ratio of the second clock count offset to the synchronization cycle.

An example in which an offset between the master clock apparatus and the slave clock apparatus is 50 ppm and a working clock of PHY is 160 MHz is used for description. T1, T2, T3, and T4 respectively indicate a time point at which the master clock apparatus sends information, a time point at which the slave clock apparatus receives the information, a time point at which the slave clock apparatus sends feedback information, and a time point at which the master clock apparatus receives the feedback information, and in the 160 MHz clock of PHY, each time length between adjacent clock count values is FTM_step$_0$ (namely, a preset time step). FIG. 14 is a schematic diagram of another embodiment of a clock synchronization method according to an embodiment of the present disclosure. As shown in FIG. 14, specific steps of the clock synchronization method are as follows:

Step S1401: A slave clock apparatus obtains a first-time clock count offset and a clock count value adjusted for the first time.

Step S1402: The slave clock apparatus obtains a clock count offset obtained through the second time of synchronization.

Step S1403: The slave clock apparatus obtains the first synchronization cycle based on a time interval between a time point at which a master clock apparatus receives the 2nd feedback information and a time point at which the master clock apparatus receives the 1st feedback information.

In this embodiment, step S1401 to step S1403 are similar to step S1301 to step S1303, and details are not described herein again.

Step S1404: The slave clock apparatus obtains the 1st clock frequency offset based on a ratio of the clock count offset obtained through the second time of synchronization to the first synchronization cycle.

In this embodiment, in a manner similar to that described in step S206 in FIG. 2, the slave clock apparatus obtains the 1st clock frequency offset based on the ratio of the clock count offset obtained through the second time of synchronization to the first synchronization cycle obtained in step S1403.

For example, based on the descriptions in the example in step S1401 to step S1403, the following may be obtained based on Formula (8):

$$delta_1 = \frac{clkoffset_2}{T}$$

where $delta_1$ is the 1st clock frequency offset, $clkoffset_2$ is the clock count offset obtained through the second time of synchronization, and T is the first synchronization cycle.

Step S1405: The slave clock apparatus adjusts a preset clock count step of the slave clock apparatus based on the 1st clock frequency offset.

Step S1406: The slave clock apparatus obtains a clock count offset obtained through an $N^{th}$ time of synchronization, where N is greater than 2.

Step S1407: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2.

Step S1408: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle.

Step S1409: The slave clock apparatus adjusts an $(N-2)^{th}$ adjusted clock count step of the slave clock apparatus based on the $(N-1)^{th}$ clock frequency offset.

Step S1410: The slave clock apparatus determines a target clock count step, performs counting based on the target clock count step, and stops adjusting the clock count step.

In this embodiment, step S1405 to step S1410 are similar to step S905 to step S910, and details are not described herein again.

(6) The slave clock apparatus obtains the first synchronization cycle based on the time interval between the time point at which the master clock apparatus receives the second feedback information and the time point at which the master clock apparatus receives the first feedback information. In addition, the slave clock apparatus obtains the first clock frequency offset based on the ratio of the sum of the first clock count offset and the second clock count offset to the synchronization cycle.

An example in which an offset between the master clock apparatus and the slave clock apparatus is 50 ppm and a working clock of PHY is 160 MHz is used for description. T1, T2, T3, and T4 respectively indicate a time point at which the master clock apparatus sends information, a time point at which the slave clock apparatus receives the information, a time point at which the slave clock apparatus sends feedback information, and a time point at which the master clock apparatus receives the feedback information, and in the 160 MHz clock of PHY, each time length between adjacent clock count values is FTM_step$_0$ (namely, a preset time step). FIG. 15 is a schematic diagram of another embodiment of a clock synchronization method according to an embodiment of the present disclosure. As shown in FIG. 15, specific steps of the clock synchronization method are as follows:

Step S1501: A slave clock apparatus obtains a first-time clock count offset and a clock count value adjusted for the first time.

Step S1502: The slave clock apparatus obtains a clock count offset obtained through the second time of synchronization.

Step S1503: The slave clock apparatus obtains the first synchronization cycle based on a time interval between a time point at which a master clock apparatus receives the 2nd feedback information and a time point at which the master clock apparatus receives the 1st feedback information.

In this embodiment, step S1501 to step S1503 are similar to step S1301 to step S1303, and details are not described herein again.

Step S1504: The slave clock apparatus obtains the 1st clock frequency offset based on a ratio of a sum of the first-time clock count offset and the clock count offset obtained through the second time of synchronization to the first synchronization cycle.

In this embodiment, in a manner similar to that described in step S206 in FIG. 2, the slave clock apparatus obtains the 1st clock frequency offset based on the ratio of the first-time clock count offset and the clock count offset obtained through the second time of synchronization to the first synchronization cycle obtained in step S1503.

For example, based on the descriptions in the example in step S1501 to step S1503, the following may be obtained based on Formula (9):

$$delta_1 = \frac{clkoffset_1 + clkoffset_2}{T}$$

where $delta_1$ is the 1st clock frequency offset, $clkoffset_1$ is the first-time clock count offset, $clkoffset_2$ is the clock count offset obtained through the second time of synchronization, and T is the first synchronization cycle.

Step S1505: The slave clock apparatus adjusts a preset clock count step of the slave clock apparatus based on the 1st clock frequency offset.

Step S1506: The slave clock apparatus obtains a clock count offset obtained through an $N^{th}$ time of synchronization, where N is greater than 2.

Step S1507: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2.

Step S1508: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle.

Step S1509: The slave clock apparatus adjusts an $(N-2)^{th}$ adjusted clock count step of the slave clock apparatus based on the $(N-1)^{th}$ clock frequency offset.

Step S1510: The slave clock apparatus determines a target clock count step, performs counting based on the target clock count step, and stops adjusting the clock count step.

In this embodiment, step S1505 to step S1510 are similar to step S905 to step S910, and details are not described herein again.

(7) The slave clock apparatus obtains the synchronization cycle based on the time interval between the time point at which the master clock apparatus sends the second information and the time point at which the master clock apparatus sends the first information and the time interval between the time point at which the master clock apparatus receives the second feedback information and the time point at which the master clock apparatus receives the first feedback information. In addition, the slave clock apparatus obtains the first clock frequency offset based on the ratio of the first clock count offset to the synchronization cycle.

ratus sends the first information and the time interval between the time point at which the master clock apparatus receives the second feedback information and the time point at which the master clock apparatus receives the first feedback information. In addition, the slave clock apparatus obtains the first clock frequency offset based on the ratio of the first clock count offset to the synchronization cycle.

An example in which an offset between the master clock apparatus and the slave clock apparatus is 50 parts per million (ppm) and a working clock of PHY is 160 MHz is used for description. T1, T2, T3, and T4 respectively indicate a time point at which the master clock apparatus sends information, a time point at which the slave clock apparatus receives the information, a time point at which the slave clock apparatus sends feedback information, and a time point at which the master clock apparatus receives the feedback information, and in the 160 MHz clock of PHY, each time length between adjacent clock count values is $FTM\_step_0$ (namely, a preset time step). FIG. 16 is a schematic diagram of another embodiment of a clock synchronization method according to an embodiment of the present disclosure. As shown in FIG. 16, specific steps of the clock synchronization method are as follows:

Step S1601: A slave clock apparatus obtains a first-time clock count offset and a clock count value adjusted for the first time.

Step S1602: The slave clock apparatus obtains a clock count offset obtained through the second time of synchronization.

In this embodiment, step S1201 and step S1202 are similar to step S901 and step S902, and details are not described herein again.

Step S1603: The slave clock apparatus obtains a synchronization cycle based on a time interval between a time point at which a master clock apparatus sends the 2nd information and a time point at which the master clock apparatus sends the 1st information and a time interval between a time point at which the master clock apparatus receives the 2nd feedback information and a time point at which the master clock apparatus receives the 1st feedback information.

In this embodiment, in a manner similar to that described in step S205 in FIG. 2, the slave clock apparatus obtains the synchronization cycle based on the time interval between the time point at which the master clock apparatus sends the 2nd information and the time point at which the master clock apparatus sends the 1st information and the time interval between the time point at which the master clock apparatus receives the 2nd feedback information and the time point at which the master clock apparatus receives the 1st feedback information.

For example, based on the descriptions in the example in step S901 and step S902, the following may be obtained based on Formula (6):

$$T_1 = \frac{(T_{1\_2} - T_{1\_1}) + (T_{4\_2} - T_{4\_1})}{2}$$

where $T_1 =$ is the synchronization cycle, $T_{1\_2}$ is the time point at which the master clock apparatus sends the 2nd information, $T_{1\_1}$ is the time point at which the master clock apparatus sends the 1st information, $T_{4\_2}$ is the time point at which the master clock apparatus receives the 2nd feedback information, and $T_{4\_1}$ is the time point at which the master clock apparatus receives the 1st feedback information.

Step S1604: The slave clock apparatus obtains the 1st clock frequency offset based on a ratio of the first-time clock count offset to the first synchronization cycle.

In this embodiment, in a manner similar to that described in step S206 in FIG. 2, the slave clock apparatus obtains the 1st clock frequency offset based on the ratio of the first-time clock count offset to the first synchronization cycle obtained in step S1603.

For example, based on the descriptions in the example in step S901 to step S903, the following may be obtained based on Formula (7):

$$\text{delta}_1 = \frac{clkoffset_1}{T}$$

where $\text{delta}_1$ is the 1st clock frequency offset, $clkoffset_1$ is the first-time clock count offset, and T is the first synchronization cycle.

Step S1605: The slave clock apparatus adjusts a preset clock count step of the slave clock apparatus based on the 1st clock frequency offset.

Step S1606: The slave clock apparatus obtains a clock count offset obtained through an $N^{th}$ time of synchronization, where N is greater than 2.

Step S1607: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2.

Step S1608: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle.

Step S1609: The slave clock apparatus adjusts an $(N-2)^{th}$ adjusted clock count step of the slave clock apparatus based on the $(N-1)^{th}$ clock frequency offset.

Step S1610: The slave clock apparatus determines a target clock count step, performs counting based on the target clock count step, and stops adjusting the clock count step.

In this embodiment, step S1605 to step S1610 are similar to step S905 to step S910, and details are not described herein again.

(8) The slave clock apparatus obtains the synchronization cycle based on the time interval between the time point at which the master clock apparatus sends the second information and the time point at which the master clock apparatus sends the first information and the time interval between the time point at which the master clock apparatus receives the second feedback information and the time point at which the master clock apparatus receives the first feedback information. In addition, the slave clock apparatus obtains the first clock frequency offset based on the ratio of the second clock count offset to the synchronization cycle.

An example in which an offset between the master clock apparatus and the slave clock apparatus is 50 ppm and a working clock of PHY is 160 MHz is used for description. T1, T2, T3, and T4 respectively indicate a time point at which the master clock apparatus sends information, a time point at which the slave clock apparatus receives the information, a time point at which the slave clock apparatus sends feedback information, and a time point at which the master clock apparatus receives the feedback information, and in the 160 MHz clock of PHY, each time length between adjacent clock count values is FTM_step$_0$ (namely, a preset time step). FIG. 17 is a schematic diagram of another embodiment of a clock synchronization method according to an embodiment of the present disclosure. As shown in FIG. 17, specific steps of the clock synchronization method are as follows:

Step S1701: A slave clock apparatus obtains a first-time clock count offset and a clock count value adjusted for the first time.

Step S1702: The slave clock apparatus obtains a clock count offset obtained through the second time of synchronization.

Step S1703: The slave clock apparatus obtains a synchronization cycle based on a time interval between a time point at which a master clock apparatus sends second information and a time point at which the master clock apparatus sends first information and a time interval between a time point at which the master clock apparatus receives second feedback information and a time point at which the master clock apparatus receives first feedback information.

In this embodiment, step S1701 to step S1703 are similar to step S1601 to step S1603, and details are not described herein again.

Step S1704: The slave clock apparatus obtains the 1st clock frequency offset based on a ratio of the clock count offset obtained through the second time of synchronization to the first synchronization cycle.

In this embodiment, in a manner similar to that described in step S206 in FIG. 2, the slave clock apparatus obtains the 1st clock frequency offset based on the ratio of the clock count offset obtained through the second time of synchronization to the first synchronization cycle obtained in step S1703.

For example, based on the descriptions in the example in step S1701 to step S1703, the following may be obtained based on Formula (8):

$$\text{delta}_1 = \frac{clkoffset_2}{T}$$

where $\text{delta}_1$ is the 1st clock frequency offset, $clkoffset_2$ is the clock count offset obtained through the second time of synchronization, and T is the first synchronization cycle.

Step S1705: The slave clock apparatus adjusts a preset clock count step of the slave clock apparatus based on the 1st clock frequency offset.

Step S1706: The slave clock apparatus obtains a clock count offset obtained through an $N^{th}$ time of synchronization, where N is greater than 2.

Step S1707: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2.

Step S1708: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle.

Step S1709: The slave clock apparatus adjusts an $(N-2)^{th}$ adjusted clock count step of the slave clock apparatus based on the $(N-1)^{th}$ clock frequency offset.

Step S1710: The slave clock apparatus determines a target clock count step, performs counting based on the target clock count step, and stops adjusting the clock count step.

In this embodiment, step S1705 to step S1710 are similar to step S905 to step S910, and details are not described herein again.

(9) The slave clock apparatus obtains the synchronization cycle based on the time interval between the time point at which the master clock apparatus sends the second information and the time point at which the master clock apparatus sends the first information and the time interval between the time point at which the master clock apparatus receives the second feedback information and the time point at which the master clock apparatus receives the first feedback information. In addition, the slave clock apparatus obtains the first clock frequency offset based on the ratio of the sum of the first clock count offset and the second clock count offset to the synchronization cycle.

An example in which an offset between the master clock apparatus and the slave clock apparatus is 50 ppm and a working clock of PHY is 160 MHz is used for description. T1, T2, T3, and T4 respectively indicate a time point at which the master clock apparatus sends information, a time point at which the slave clock apparatus receives the information, a time point at which the slave clock apparatus sends feedback information, and a time point at which the master clock apparatus receives the feedback information, and in the 160 MHz clock of PHY, each time length between adjacent clock count values is $FTM\_step_0$ (namely, a preset time step). FIG. 18 is a schematic diagram of another embodiment of a clock synchronization method according to an embodiment of the present disclosure. As shown in FIG. 18, specific steps of the clock synchronization method are as follows:

Step S1801: A slave clock apparatus obtains a first-time clock count offset and a clock count value adjusted for the first time.

Step S1802: The slave clock apparatus obtains a clock count offset obtained through the second time of synchronization.

Step S1803: The slave clock apparatus obtains a synchronization cycle based on a time interval between a time point at which a master clock apparatus sends second information and a time point at which the master clock apparatus sends first information and a time interval between a time point at which the master clock apparatus receives second feedback information and a time point at which the master clock apparatus receives first feedback information.

In this embodiment, step S1801 to step S1803 are similar to step S1601 to step S1603, and details are not described herein again.

Step S1804: The slave clock apparatus obtains the 1st clock frequency offset based on a ratio of a sum of the first-time clock count offset and the clock count offset obtained through the second time of synchronization to the first synchronization cycle.

In this embodiment, in a manner similar to that described in step S206 in FIG. 2, the slave clock apparatus obtains the 1st clock frequency offset based on the ratio of the first-time clock count offset and the clock count offset obtained through the second time of synchronization to the first synchronization cycle obtained in step S1803.

For example, based on the descriptions in the example in step S1801 to step S1803, the following may be obtained based on Formula (9):

$$delta_1 = \frac{clkoffset_1 + clkoffset_2}{T}$$

where $delta_1$ is the 1st clock frequency offset, $clkoffset_1$ is the first-time clock count offset, $clkoffset_2$ is the clock count offset obtained through the second time of synchronization, and T is the first synchronization cycle.

Step S1805: The slave clock apparatus adjusts a preset clock count step of the slave clock apparatus based on the 1st clock frequency offset.

Step S1806: The slave clock apparatus obtains a clock count offset obtained through an $N^{th}$ time of synchronization, where N is greater than 2.

Step S1807: The slave clock apparatus obtains an $N^{th}$ synchronization cycle based on a time interval between a time point at which the master clock apparatus sends $N^{th}$ information and a time point at which the master clock apparatus sends $N^{th}$ information, where N is greater than 2.

Step S1808: The slave clock apparatus obtains an $(N-1)^{th}$ clock frequency offset based on a ratio of the clock count offset obtained through the $(N-1)^{th}$ time of synchronization to the $(N-1)^{th}$ synchronization cycle.

Step S1809: The slave clock apparatus adjusts an $(N-2)^{th}$ adjusted clock count step of the slave clock apparatus based on the $(N-1)^{th}$ clock frequency offset.

Step S1810: The slave clock apparatus determines a target clock count step, performs counting based on the target clock count step, and stops adjusting the clock count step.

In this embodiment, step S1805 to step S1810 are similar to step S905 to step S910, and details are not described herein again.

The foregoing mainly describes the solutions provided in the embodiments of the present disclosure from the perspective of the method. It can be understood that, to implement the foregoing functions, the clock synchronization apparatus includes a hardware structure and/or software module to perform each corresponding function. A person of ordinary skill in the art should be easily aware that, in combination with the examples described in embodiments disclosed in this specification, modules, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, the clock synchronization apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of the present disclosure, module division is an example, and is merely logical function division. During actual implementation, another division manner may be used.

Figure 19:
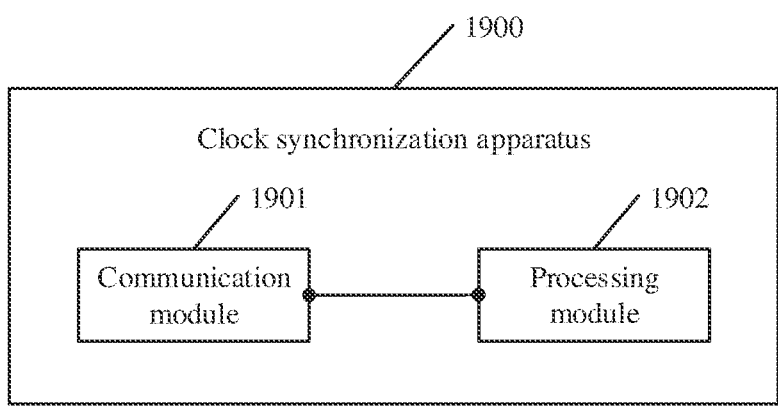
FIG. 19 is a schematic diagram of a structure of a clock synchronization apparatus according to an embodiment of the present disclosure.

Therefore, the following describes in detail the clock synchronization apparatus in the present disclosure. FIG. 19 is a schematic diagram of a structure of a clock synchronization apparatus according to an embodiment of the present disclosure. As shown in the figure, a clock synchronization apparatus 1900 includes:

a communication module 1901, configured to obtain a first time point at which a master clock apparatus sends first information, a second time point at which the slave clock apparatus receives the first information from the master clock apparatus, a third time point at which the slave clock apparatus sends first feedback information, and a fourth time point at which the master clock apparatus receives the first feedback information from the slave clock apparatus, where the first feedback information is generated based on the first information; and a processing module 1902, configured to obtain a first clock count offset based on the first time point, the second time point, the third time point, and the fourth time point, where the first clock count offset is used to indicate a difference between a clock count value of the slave clock apparatus and a clock count value of the master clock apparatus, where the processing module 1902 is further configured to obtain a first clock frequency offset based on the first clock count offset, where the first clock frequency offset is a difference between a clock count frequency of the slave clock apparatus and a clock count frequency of the master clock apparatus; and the processing module 1902 is further configured to adjust a clock count step of the slave clock apparatus based on the first clock frequency offset, where the clock count step is a time length between adjacent clock count values.

In an optional implementation, based on the embodiment corresponding to FIG. 19, in another embodiment of the clock synchronization apparatus 1900 provided in this embodiment, the communication module 1901 is further configured to obtain, based on the first clock count offset, an adjusted fifth time point at which the slave clock apparatus receives second information from the master clock apparatus and an adjusted sixth time point at which the slave clock apparatus sends second feedback information, where the second information is adjacent to the first information, and the second feedback information is generated based on the second information.

In an optional implementation, based on the embodiment corresponding to FIG. 19, in another embodiment of the clock synchronization apparatus 1900 provided in this embodiment, the communication module 1901 is further configured to obtain a seventh time point at which the master clock apparatus sends the second information and an eighth time point at which the master clock apparatus receives the second feedback information from the slave clock apparatus; and the processing module 1902 is specifically configured to:
obtain a second clock count offset based on the adjusted fifth time point, the adjusted sixth time point, the seventh time point, and the eighth time point; and
obtain the first clock frequency offset based on the first clock count offset and/or the second clock count offset.

In an optional implementation, based on the embodiment corresponding to FIG. 19, in another embodiment of the clock synchronization apparatus 1900 provided in this embodiment, the processing module 1902 is further configured to obtain a synchronization cycle based on a time interval between the time point at which the master clock apparatus sends the second information and the time point at which the master clock apparatus sends the first information, where the synchronization cycle is used to adjust the clock count step of the slave clock apparatus; or the processing module 1902 is further configured to obtain the synchronization cycle based on a time interval between the time point at which the master clock apparatus receives the second feedback information and the time point at which the master clock apparatus receives the first feedback information; or the processing module 1902 is further configured to obtain the synchronization cycle based on a time interval between the time point at which the master clock apparatus sends the second information and the time point at which the master clock apparatus sends the first information and a time interval between the time point at which the master clock apparatus receives the second feedback information and the time point at which the master clock apparatus receives the first feedback information.

In an optional implementation, based on the embodiment corresponding to FIG. 19, in another embodiment of the clock synchronization apparatus 1900 provided in this embodiment, the first clock frequency offset is a ratio of the first clock count offset to the synchronization cycle, or the first clock frequency offset is a ratio of the second clock count offset to the synchronization cycle, or the first clock frequency offset is a ratio of a sum of the first clock count offset and the second clock count offset to the synchronization cycle.

In an optional implementation, based on the embodiment corresponding to FIG. 19, in another embodiment of the clock synchronization apparatus 1900 provided in this embodiment, the processing module 1902 is further configured to: when a quantity of adjustment times of the clock count step is equal to a synchronization times threshold, determine an adjusted clock count step as a target clock count step; and the processing module 1902 is further configured to:
perform counting based on the target clock count step, and stop adjusting the clock count step; or
the processing module 1902 is further configured to: when the clock frequency offset is less than a minimum clock frequency offset threshold, determine, as a target clock count step, a clock count step whose clock frequency offset is less than the minimum clock frequency offset threshold; and
the processing module 1902 is further configured to:
perform counting based on the target clock count step, and stop adjusting the clock count step; or
the processing module 1902 is further configured to: when the clock frequency offset is greater than a maximum clock frequency offset threshold, perform clock synchronization again.

Figure 20:
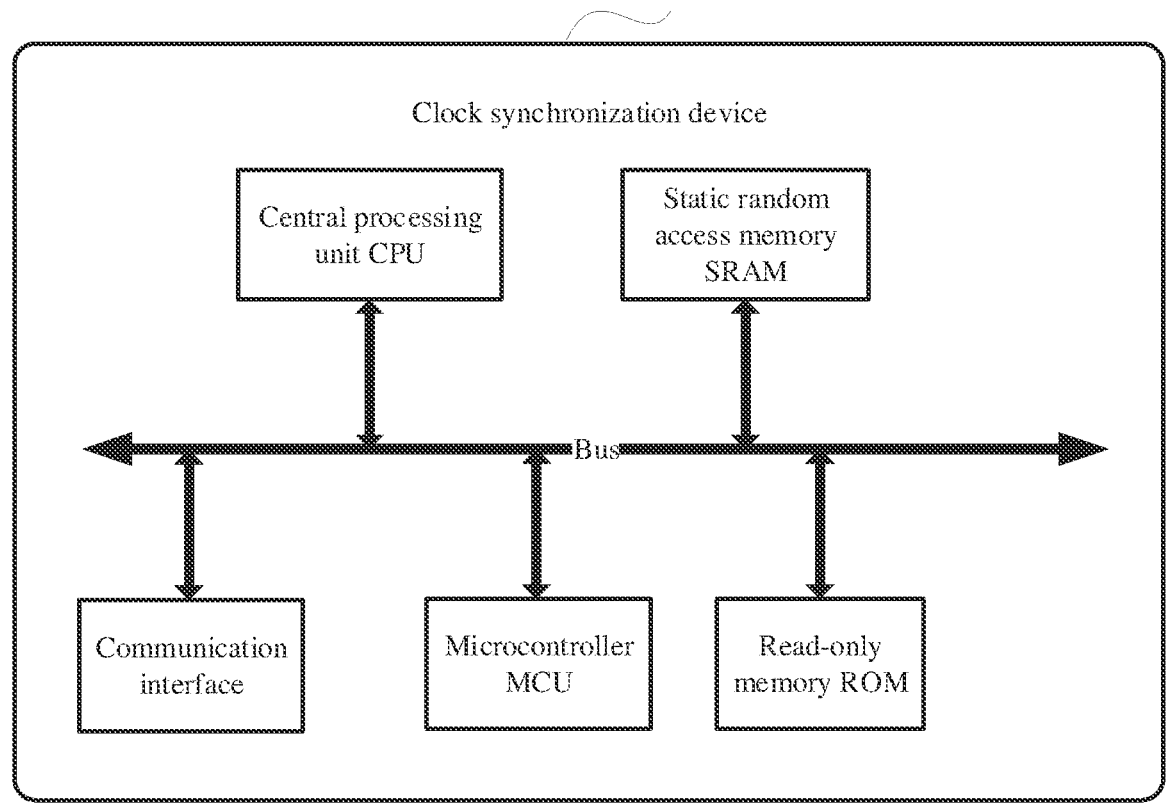
FIG. 20 is a schematic diagram of a structure of a clock synchronization device according to an embodiment of the present disclosure.

FIG. 20 is a schematic diagram of a specific logical structure of a clock synchronization device 2000 in the foregoing embodiment according to an embodiment of the present disclosure. The clock synchronization device 2000 may be a processor chip of a slave clock apparatus, and the processor chip may be, for example, a Wi-Fi chip for implementing communication.

The clock synchronization device 2000 includes at least one CPU and a memory. A type of the memory may include, for example, an SRAM, a ROM, a microcontroller (Microcontroller Unit, MCU), a bus, and a communication interface. Although not shown in FIG. 20, the clock synchronization device 2000 may further include another dedicated processor such as an application processor (AP) or an NPU, and another subsystem such as a clock management subsystem.

The foregoing parts of the clock synchronization device 2000 are coupled by using a connector. For example, the connector includes various interfaces, transmission lines, buses, and the like. These interfaces are generally electrical communication interfaces, but may also be mechanical interfaces or interfaces in another form. This is not limited in this embodiment.

Optionally, the CPU may be a single-core (single-CPU) processor or a multi-core (multi-CPU) processor. Optionally, the CPU may be a processor group including a plurality of processors, and the plurality of processors are coupled to each other by using one or more buses. In an optional case, the CPU implements any clock synchronization method in the foregoing method embodiments by invoking program instructions stored in an on-chip memory or an off-chip memory. In an optional case, the CPU and the MCU jointly implement any clock synchronization method in the foregoing method embodiments. For example, the CPU completes some steps in the clock synchronization method, and the MCU completes other steps in the clock synchronization method. In an optional case, the AP or another dedicated processor implements any clock synchronization method in the foregoing method embodiments by invoking program instructions stored in an on-chip memory or an off-chip memory.

The communication interface may be an interface of the processor chip for receiving and sending data. The communication interface generally includes a plurality of interfaces. In an optional case, the communication interface may include an inter-integrated circuit (I2C) interface, a serial peripheral interface (SPI), a universal asynchronous receiver/transmitter (Universal asynchronous receiver-transmitter, UART) interface, a general purpose input/output (GPIO) interface, and the like. It should be understood that these interfaces may implement different functions by multiplexing a same physical interface.

In an optional case, the communication interface may further include a high definition multimedia interface (HDMI), a V-By-One interface, an embedded display port (eDP), a mobile industry processor interface (Mobile Industry Processor Interface, MIPI), a display port (DP), or the like.

In an optional case, the foregoing parts are integrated into a same chip. In another optional case, the memory may be an independent chip.

The chips in this embodiment are systems manufactured on a same semiconductor substrate by using an integrated circuit process, and are also referred to as semiconductor chips. The chip may be a set of integrated circuits manufactured on the substrate (which is generally a semiconductor material such as silicon) by using the integrated circuit process, and an outer layer of the chip is generally packaged with a semiconductor packaging material. The integrated circuit may include various types of functional components. Each type of functional component includes a logic gate circuit, and a transistor such as a metal-oxide semiconductor (MOS) transistor, a bipolar transistor, or a diode, or may include another part such as a capacitor, a resistor, or an inductor. Each functional component may independently work or work under action of necessary driver software, and may implement various functions such as communication, operation, or storage.

An embodiment of the present disclosure provides a clock synchronization device, including at least one processor. The at least one processor is configured to execute a computer program stored in a memory, so that the clock synchronization device performs the method performed by the slave clock apparatus in any one of the foregoing method embodiments.

An embodiment of the present disclosure provides a computer program product. The computer program product includes a computer program (also referred to as code or instructions). When the computer program is run, a computer is enabled to perform the method performed by the slave clock apparatus in any one of the foregoing method embodiments.

The present disclosure further provides a clock synchronization apparatus, including at least one processor. The at least one processor is configured to execute a computer program stored in a memory, so that the clock synchronization apparatus performs the method performed by the slave clock apparatus in any one of the foregoing method embodiments.

It should be understood that the clock synchronization apparatus may be one or more chips. For example, the clock synchronization apparatus may be a field programmable gate array (FPGA), an application-specific integrated chip (ASIC), a system on chip (SoC), a central processing unit (CPU), a network processor (NP), a digital signal processing circuit (DSP), a microcontroller (micro controller unit, MCU), a programmable controller (programmable logic device, PLD), or another integrated chip.

An embodiment of the present disclosure further provides a clock synchronization apparatus, including a processor and a communication interface. The communication interface is coupled to the processor. The communication interface is configured to input and/or output information. The information includes at least one of instructions and data. The processor is configured to execute a computer program, so that the clock synchronization apparatus performs the method performed by the slave clock apparatus in any one of the foregoing method embodiments. It should be understood that the communication interface may be implemented by using same hardware logic, or may be implemented by using different hardware logic. For example, one hardware interface may have only an input function or an output function, or one hardware interface may have both an input function and an output function.

An embodiment of the present disclosure further provides a clock synchronization apparatus, including a processor and a memory. The memory is configured to store a computer program, and the processor is configured to invoke the computer program from the memory and run the computer program, so that the clock synchronization apparatus performs the method performed by the slave clock apparatus in any one of the foregoing method embodiments.

In an implementation process, steps of the foregoing methods may be implemented by using a hardware integrated logic circuit in the processor or by using instructions in a form of software. The steps of the method disclosed with reference to embodiments of the present disclosure may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor. To avoid repetition, details are not described herein again.

It should be noted that the processor in this embodiment may be an integrated circuit chip and has a signal processing capability. In an implementation process, steps of the foregoing method embodiments may be implemented by using a hardware integrated logic circuit in the processor or by using instructions in a form of software. The foregoing processor may be a general-purpose processor, a digital signal processor (DSP), an application-specific integrated circuit (ASIC), a field programmable gate array (FPGA) or another programmable logic device, a discrete gate, a transistor logic device, or a discrete hardware component. The processor may implement or perform the methods, steps, and logical block diagrams that are disclosed in the embodiments of the present disclosure. The general-purpose processor may be a microprocessor, or the processor may be any conventional processor or the like. The steps of the method disclosed with reference to embodiments of the present disclosure may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor.

It may be understood that the memory in the embodiments of the present disclosure may be a volatile memory or a nonvolatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DRRAM). It should be noted that the system and the method that are described in this specification aim to include but not limited to these memories and a memory of any other proper type.

Based on the method provided in the embodiments of the present disclosure, the present disclosure further provides a computer program product. The computer program product includes computer program code. When the computer program code is run on a computer, the computer is enabled to perform the methods performed by the units in the embodiments shown in FIG. 2, FIG. 8A and FIG. 8B, FIG. 9, and FIG. 11 to FIG. 18.

Based on the methods provided in the embodiments of the present disclosure, the present disclosure further provides a computer-readable storage medium. The computer-readable storage medium stores program code. When the program code is run on a computer, the computer is enabled to perform the methods performed by the units in the embodiments shown in FIG. 2, FIG. 8A and FIG. 8B, FIG. 9, and FIG. 11 to FIG. 18.

The modules in the foregoing apparatus embodiments fully correspond to the units in the method embodiments. A corresponding module or unit performs a corresponding step. For example, a communication unit (a transceiver) performs a receiving step or a sending step in the method embodiments, and a processing unit (a processor) may perform steps other than the sending step and the receiving step. For a function of a specific unit, refer to a corresponding method embodiment. There may be one or more processors.

Terms such as "part", "module", and "system" used in this specification are used to indicate computer-related entities, hardware, firmware, combinations of hardware and software, software, or software being executed. For example, a part may be but is not limited to a process that runs on a processor, a processor, an object, an executable file, an execution thread, a program, and/or a computer. As shown in the figures, both a computing device and an application that runs on the computing device may be parts. One or more parts may reside in a process and/or an execution thread, and a part may be located on one computer and/or distributed between two or more computers. In addition, these parts may be executed from various computer-readable media that store various data structures. For example, the parts may perform communication by using a local process and/or a remote process and based on a signal with one or more data packets (for example, data from two parts interacting with another part in a local system, a distributed system, and/or across a network such as the Internet interacting with other systems by using the signal).

A person of ordinary skill in the art may be aware that, in combination with examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of embodiments.

In addition, functional units in the embodiments of the present disclosure may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the conventional technology, or a part of the technical solutions may be implemented in the form of a software product. The computer software product is stored in a storage medium and includes several instructions for instructing a computer device (which may be a personal computer, a server, or a network device) to perform all or a part of the steps of the methods in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A clock synchronization method, comprising:
obtaining, by a slave clock apparatus, a first time point at which a master clock apparatus sends first information, a second time point at which the slave clock apparatus receives the first information from the master clock apparatus, a third time point at which the slave clock apparatus sends first feedback information, and a fourth time point at which the master clock apparatus receives the first feedback information from the slave clock apparatus, wherein the first feedback information is generated based on the first information;
obtaining, by the slave clock apparatus, a first clock count offset based on the first time point, the second time point, the third time point, and the fourth time point, wherein the first clock count offset indicates a difference between a clock count value of the slave clock apparatus and a clock count value of the master clock apparatus;
obtaining, by the slave clock apparatus based on the first clock count offset, an adjusted fifth time point at which the slave clock apparatus receives second information from the master clock apparatus;
obtaining, by the slave clock apparatus, a synchronization cycle based on a time interval between a seventh time point at which the master clock apparatus sends the second information and a time point at which the master clock apparatus sends the first information;
obtaining, by the slave clock apparatus, a first clock frequency offset based on the first clock count offset, wherein the first clock frequency offset is a ratio of the first clock count offset to the synchronization cycle, or the first clock frequency offset is a ratio of a second clock count offset to the synchronization cycle, or the first clock frequency offset is a ratio of a sum of the first clock count offset and the second clock count offset to the synchronization cycle; and
adjusting, by the slave clock apparatus, a clock count step of the slave clock apparatus based on the first clock frequency offset, wherein the clock count step is a time length between adjacent clock count values.

2. The method according to claim 1, further comprising:
obtaining, by the slave clock apparatus based on the first clock count offset, an adjusted sixth time point at which the slave clock apparatus sends second feedback information, wherein the second information is adjacent to the first information, and the second feedback information is generated based on the second information.

3. The method according to claim 2, further comprising:
obtaining, by the slave clock apparatus, the seventh time point at which the master clock apparatus sends the second information and an eighth time point at which the master clock apparatus receives the second feedback information from the slave clock apparatus; and
the obtaining, by the slave clock apparatus, a first clock frequency offset based on the first clock count offset comprises:
obtaining, by the slave clock apparatus, the second clock count offset based on the adjusted fifth time point, the adjusted sixth time point, the seventh time point, and the eighth time point; and
obtaining, by the slave clock apparatus, the first clock frequency offset based on at least one of the first clock count offset or the second clock count offset.

4. The method according to claim 3,
wherein the clock count step of the slave clock apparatus is adjustable by the synchronization cycle.

5. The method according to claim 4, further comprising:
obtaining, by the slave clock apparatus, the synchronization cycle based on a time interval between the eighth time point at which the master clock apparatus receives the second feedback information and a time point at which the master clock apparatus receives the first feedback information.

6. The method according to claim 4, further comprising:
obtaining, by the slave clock apparatus, the synchronization cycle based on a time interval between the seventh time point at which the master clock apparatus sends the second information and the time point at which the master clock apparatus sends the first information and a time interval between the eighth time point at which the master clock apparatus receives the second feedback information and the time point at which the master clock apparatus receives the first feedback information.

7. The method according to claim 4, wherein when the first clock frequency offset is less than a minimum clock frequency offset threshold, the slave clock apparatus determines, as a target clock count step, a clock count step whose clock frequency offset is less than the minimum clock frequency offset threshold; and
the slave clock apparatus performs counting based on the target clock count step, and stops adjusting the clock count step.

8. The method according to claim 4, wherein
when the first clock frequency offset is greater than a maximum clock frequency offset threshold, the slave clock apparatus performs clock synchronization again.

9. A clock synchronization method, comprising:
obtaining, by a slave clock apparatus, a first time point at which a master clock apparatus sends first information, a second time point at which the slave clock apparatus receives the first information from the master clock apparatus, a third time point at which the slave clock apparatus sends first feedback information, and a fourth time point at which the master clock apparatus receives the first feedback information from the slave clock apparatus, wherein the first feedback information is generated based on the first information;

obtaining, by the slave clock apparatus, a first clock count offset based on the first time point, the second time point, the third time point, and the fourth time point, wherein the first clock count offset indicates a difference between a clock count value of the slave clock apparatus and a clock count value of the master clock apparatus;

obtaining, by the slave clock apparatus, a first clock frequency offset based on the first clock count offset, wherein the first clock frequency offset is a difference between a clock count frequency of the slave clock apparatus and a clock count frequency of the master clock apparatus; and adjusting, by the slave clock apparatus, a clock count step of the slave clock apparatus based on the first clock frequency offset, wherein the clock count step is a time length between adjacent clock count values, wherein the method further comprises:

obtaining, by the slave clock apparatus based on the first clock count offset, an adjusted fifth time point at which the slave clock apparatus receives second information from the master clock apparatus and an adjusted sixth time point at which the slave clock apparatus sends second feedback information, wherein the second information is adjacent to the first information, and the second feedback information is generated based on the second information;

obtaining, by the slave clock apparatus, a seventh time point at which the master clock apparatus sends the second information and an eighth time point at which the master clock apparatus receives the second feedback information from the slave clock apparatus; and obtaining, by the slave clock apparatus, a synchronization cycle based on a time interval between the seventh time point at which the master clock apparatus sends the second information and a time point at which the master clock apparatus sends the first information, wherein the clock count step of the slave clock apparatus can be adjusted by the synchronization cycle, wherein the obtaining, by the slave clock apparatus, a first clock frequency offset based on the first clock count offset comprises:

obtaining, by the slave clock apparatus, a second clock count offset based on the adjusted fifth time point, the adjusted sixth time point, the seventh time point, and the eighth time point; and obtaining, by the slave clock apparatus, the first clock frequency offset based on the first clock count offset and/or the second clock count offset, and wherein when a quantity of adjustment times of the clock count step is equal to a synchronization times threshold, the slave clock apparatus determines an adjusted clock count step as a target clock count step; and the slave clock apparatus performs counting based on the target clock count step, and stops adjusting the clock count step.

10. An apparatus, which is a slave clock apparatus or included in the slave clock apparatus, wherein the apparatus comprises; at least one processor, wherein the at least one processor is coupled to a memory; and the memory, configured to store a computer program, wherein the at least one processor is configured to execute the computer program stored in the memory, to cause the apparatus to perform operations, comprising:

obtaining a first time point at which a master clock apparatus sends first information, a second time point at which the slave clock apparatus receives the first information from the master clock apparatus, a third time point at which the slave clock apparatus sends first feedback information, and a fourth time point at which the master clock apparatus receives the first feedback information from the slave clock apparatus, wherein the first feedback information is generated based on the first information; and obtaining a first clock count offset based on the first time point, the second time point, the third time point, and the fourth time point, wherein the first clock count offset indicates a difference between a clock count value of the slave clock apparatus and a clock count value of the master clock apparatus;

obtaining, based on the first clock count offset, an adjusted fifth time point at which the slave clock apparatus receives second information from the master clock apparatus;

obtaining a synchronization cycle based on a time interval between a seventh time point at which the master clock apparatus sends the second information and a time point at which the master clock apparatus sends the first information;

obtaining a first clock frequency offset based on the first clock count offset, wherein the first clock frequency offset is a ratio of the first clock count offset to the synchronization cycle, or the first clock frequency offset is a ratio of a second clock count offset to the synchronization cycle, or the first clock frequency offset is a ratio of a sum of the first clock count offset and the second clock count offset to the synchronization cycle; and adjusting a clock count step of the slave clock apparatus based on the first clock frequency offset, wherein the clock count step is a time length between adjacent clock count values.

11. The apparatus according to claim 10, wherein the operations further comprise:

obtaining, based on the first clock count offset, an adjusted sixth time point at which the slave clock apparatus sends second feedback information, wherein the second information is adjacent to the first information, and the second feedback information is generated based on the second information.

12. The apparatus according to claim 11, wherein the operations further comprise:

obtaining the seventh time point at which the master clock apparatus sends the second information and an eighth time point at which the master clock apparatus receives the second feedback information from the slave clock apparatus; and the obtaining a first clock frequency offset based on the first clock count offset comprises:

obtaining the second clock count offset based on the adjusted fifth time point, the adjusted sixth time point, the seventh time point, and the eighth time point; and obtaining the first clock frequency offset based on at least one of the first clock count offset or the second clock count offset.

13. The apparatus according to claim 12,
wherein the synchronization cycle is used to adjust the
clock count step of the slave clock apparatus.

14. The apparatus according to claim 13, wherein
the at least one processor is further configured to obtain
the synchronization cycle based on a time interval
between the eighth time point at which the master clock
apparatus receives the second feedback information
and a time point at which the master clock apparatus
receives the first feedback information.

15. The apparatus according to claim 13, wherein the
operations further comprise:
obtaining the synchronization cycle based on a time
interval between the seventh time point at which the
master clock apparatus sends the second information
and the time point at which the master clock apparatus
sends the first information and a time interval between
the eighth time point at which the master clock appa-
ratus receives the second feedback information and the
time point at which the master clock apparatus receives
the first feedback information.

16. The apparatus according to claim 3, wherein the
operations further comprise:

when a quantity of adjustment times of the clock count
step is equal to a synchronization times threshold,
determining an adjusted clock count step as a target
clock count step; and
performing counting based on the target clock count step,
and stop adjusting the clock count step.

17. The apparatus according to claim 13, wherein the
operations further comprise:
when the first clock frequency offset is less than a
minimum clock frequency offset threshold, determin-
ing, as a target clock count step, a clock count step
whose clock frequency offset is less than the minimum
clock frequency offset threshold; and
performing counting based on the target clock count step,
and stop adjusting the clock count step.

18. The apparatus according to claim 13, wherein the
operations further comprise:
when the first clock frequency offset is greater than a
maximum clock frequency offset threshold, performing
clock synchronization again.

\* \* \* \* \*